United States Patent
Horie et al.

(10) Patent No.: US 7,321,668 B2
(45) Date of Patent: Jan. 22, 2008

(54) OBJECT DETECTION APPARATUS, OBJECT DETECTION METHOD AND COMPUTER PROGRAM PRODUCT

(75) Inventors: Daisaku Horie, Uji (JP); Yuusuke Nakano, Akashi (JP)

(73) Assignee: Konica Minolta Holdings, Inc., Tokyo (JP)

(*) Notice: Subject to any disclaimer, the term of this patent is extended or adjusted under 35 U.S.C. 154(b) by 766 days.

(21) Appl. No.: 10/786,775

(22) Filed: Feb. 25, 2004

(65) Prior Publication Data

US 2005/0117779 A1  Jun. 2, 2005

(30) Foreign Application Priority Data

Nov. 27, 2003  (JP) ............... 2003-397999

(51) Int. Cl.
*G06K 9/00* (2006.01)
(52) U.S. Cl. ............... 382/103; 382/115; 382/190
(58) Field of Classification Search ......... 382/100.103, 382/115, 118, 185, 190, 149, 236, 287; 348/94, 348/125, 152, 154, 155, 208.1, 208.2, 208.16, 348/347, 352
See application file for complete search history.

(56) References Cited

U.S. PATENT DOCUMENTS

| | | | | |
|---|---|---|---|---|
| 6,160,581 | A * | 12/2000 | Higashihara et al. | 348/364 |
| 6,163,337 | A * | 12/2000 | Azuma et al. | 348/43 |
| 6,445,807 | B1 * | 9/2002 | Katayama et al. | 382/100 |
| 6,529,630 | B1 | 3/2003 | Kinjo | 382/190 |
| 6,639,998 | B1 * | 10/2003 | Lee et al. | 382/103 |
| 6,940,545 | B1 * | 9/2005 | Ray et al. | 348/222.1 |
| 7,092,569 | B1 * | 8/2006 | Kinjo | 382/190 |

FOREIGN PATENT DOCUMENTS

| | | |
|---|---|---|
| JP | 11-316845 | 11/1999 |
| JP | 2000-99722 | 4/2000 |
| JP | 2002-260073 | 9/2002 |
| JP | 2003-108980 | 4/2003 |

OTHER PUBLICATIONS

Japanese Office Action, dated Jul. 11, 2006, for counterpart JP Patent Application No. 2003-397999.

* cited by examiner

*Primary Examiner*—Samir Ahmed
*Assistant Examiner*—Abolfazl Tabaabai
(74) *Attorney, Agent, or Firm*—Sidley Austin LLP

(57) ABSTRACT

An object detection apparatus is provided that detects a target object correctly without decreasing a process speed so much even if there is a change in a shooting environment. The human body detection apparatus for detecting a human body in an image includes an image input portion for entering an image taken by a camera, a plurality of plane generation portions for detecting features of the image by using different methods, a section for obtaining conditions about shooting by the camera, a section for calculating reliability values of features detected by the plane generation portions in the case of the obtained condition, and a detection process portion for detecting a human body in the shot image in accordance with features detected from the shot image detected by one or more of the plane generation portions and reliability values of the features.

23 Claims, 42 Drawing Sheets

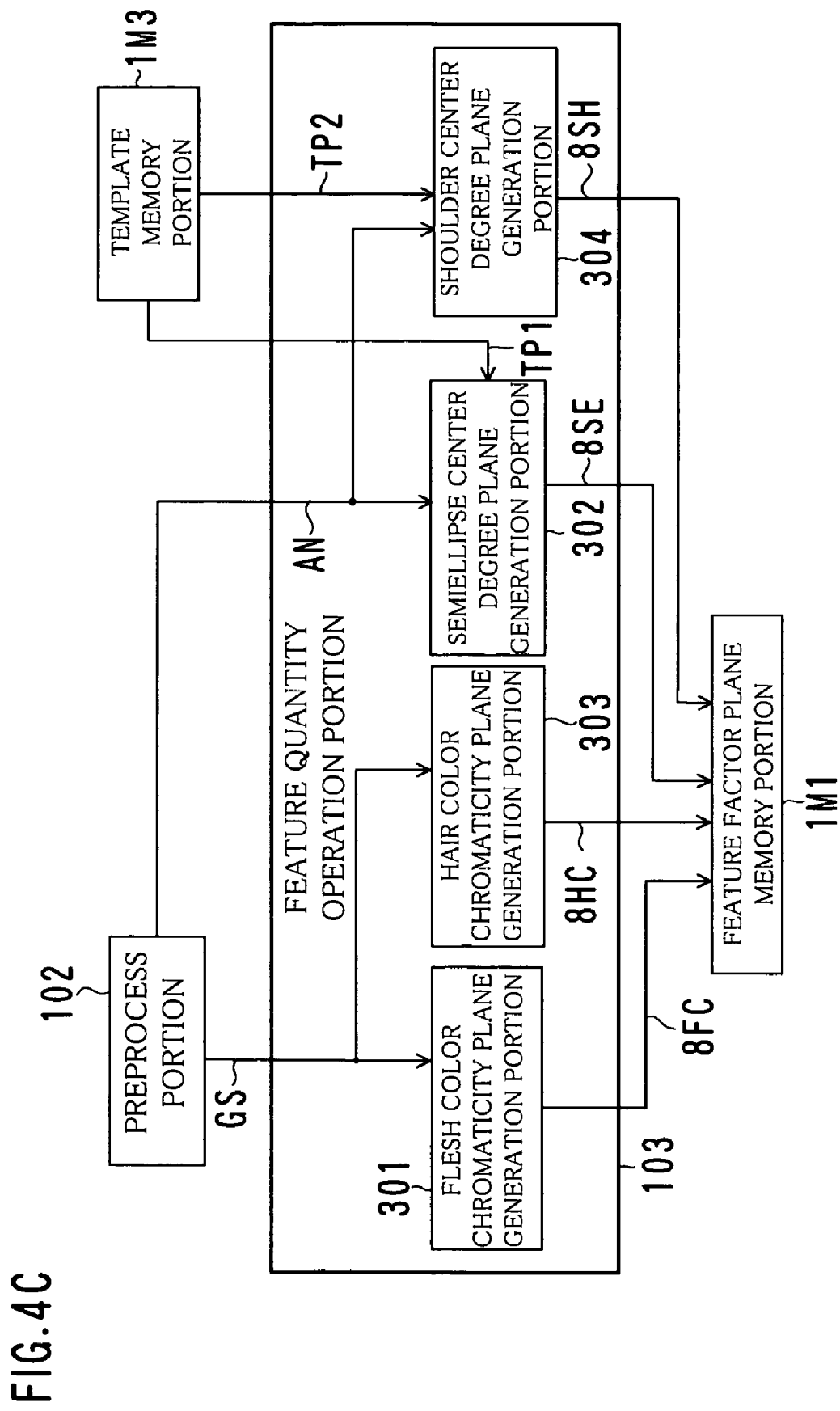

FLESH COLOR CHROMATICITY PLANE

SEMIELLIPSE CENTER DEGREE PLANE

HAIR COLOR CHROMATICITY PLANE

SHOULDER CENTER DEGREE PLANE

↓ MATCHING

ENLARGE AREA ENCLOSED BY BROKEN LINE

↓ OFFSET CORRECTION

FIG.29A

| CAUSE OF CHANGE | KIND OF CHANGE ABOUT SHOOTING CONDITION INDICATED IN CONDITION INFORMATION | | PHENOMENA | AFFECTED FEATURE QUANTITY (FEATURE FACTOR) |
|---|---|---|---|---|
| TIME CHANGE | LIGHTING CHANGE | ILLUMINANCE SHADOW WHITE BALANCE | CHANGE IN FLESH COLOR OR HAIR COLOR | FLESH COLOR CHROMATICITY OR HAIR COLOR CHROMATICITY |
| | CUSTOMER CLASS CHANGE | PARTY (COUPLE OR FAMILY) | CHANGE IN OVERLAPPING OF PEDESTRIANS DUE TO INCREASE OF THE NUMBER OF CUSTOMERS | SHOULDER CENTER DEGREE |
| | | | CHANGE IN HAIR COLOR, HAIR STYLE, BELONGINGS, CLOTHING OR ACCESSORY | FLESH COLOR CHROMATICITY, HAIR COLOR CHROMATICITY, SEMIELLIPSE CENTER DEGREE OR SHOULDER CENTER DEGREE |
| | | AGE BRACKET | HEIGHT | FLESH COLOR CHROMATICITY, HAIR COLOR CHROMATICITY, SEMIELLIPSE CENTER DEGREE OR SHOULDER CENTER DEGREE |
| | | WALKING SPEED | CHANGE IN OVERLAPPING OF PEDESTRIANS | SHOULDER CENTER DEGREE |
| | | | CHANGE IN TIME DIFFERENTIAL DETECTION ACCURACY | SEMIELLIPSE CENTER DEGREE OR SHOULDER CENTER DEGREE |
| | THE NUMBER OF CUSTOMERS | | CHANGE IN OVERLAPPING OF PEDESTRIANS DUE TO INCREASE OF THE NUMBER OF CUSTOMERS | SHOULDER CENTER DEGREE |

FIG.29B

| CAUSE OF CHANGE | KIND OF CHANGE ABOUT SHOOTING CONDITION INDICATED IN CONDITION INFORMATION | PHENOMENA | AFFECTED FEATURE QUANTITY (FEATURE FACTOR) |
|---|---|---|---|
| | OPTIC ANGLE CHANGE | CHANGE IN FLESH COLOR OR HAIR COLOR | FLESH COLOR CHROMATICITY OR HAIR COLOR CHROMATICITY |
| | | CHANGE IN OVERLAPPING OF PEDESTRIANS | SHOULDER CENTER DEGREE |
| | FRAME RATE CHANGE | CHANGE IN TIME DIFFERENTIAL DETECTION ACCURACY | SHOULDER CENTER DEGREE |
| | COLOR OR TEXTURE IN BACKGROUND | CHANGE IN AMOUNT OF AREA HAVING SAME COLOR AS FLESH COLOR OR HAIR COLOR EXCEPT HEAD | FLESH COLOR CHROMATICITY OR HAIR COLOR CHROMATICITY |
| | | CHANGE IN AMOUNT OF EDGE EXCEPT HEAD | SEMIELLIPSE CENTER DEGREE OR SHOULDER CENTER DEGREE |
| | | CHANGE IN EXTRACTION ACCURACY OF SUBJECT CONTOUR | SEMIELLIPSE CENTER DEGREE OR SHOULDER CENTER DEGREE |
| CAMERA CHANGE | INSTALLATION LOCATION CHANGE | SEE FIG.29A | FLESH COLOR CHROMATICITY, HAIR COLOR CHROMATICITY, SEMIELLIPSE CENTER DEGREE OR SHOULDER CENTER DEGREE |
| | LIGHTING | SEE FIG.29A | FLESH COLOR CHROMATICITY, HAIR COLOR CHROMATICITY, SEMIELLIPSE CENTER DEGREE OR SHOULDER CENTER DEGREE |
| | CUSTOMER CLASS | SEE FIG.29A | FLESH COLOR CHROMATICITY, HAIR COLOR CHROMATICITY, SEMIELLIPSE CENTER DEGREE OR SHOULDER CENTER DEGREE |
| | THE NUMBER OF CUSTOMERS | | |

| ENVIRONMENT PARAMETERS | | | | RELIABILITY VALUES | | | |
|---|---|---|---|---|---|---|---|
| $\theta 1$ | $\theta 2$ | ... | $\theta N$ | R1 | R2 | R3 | R4 |
| 0 | 0 | ... | 0 | 10 | 10 | 10 | 10 |
| 1 | 0 | ... | 0 | 20 | 10 | 10 | 10 |
| 2 | 0 | ... | 0 | 30 | 10 | 10 | 10 |
| ⋮ | ⋮ | ⋮ | ⋮ | ⋮ | ⋮ | ⋮ | ⋮ |

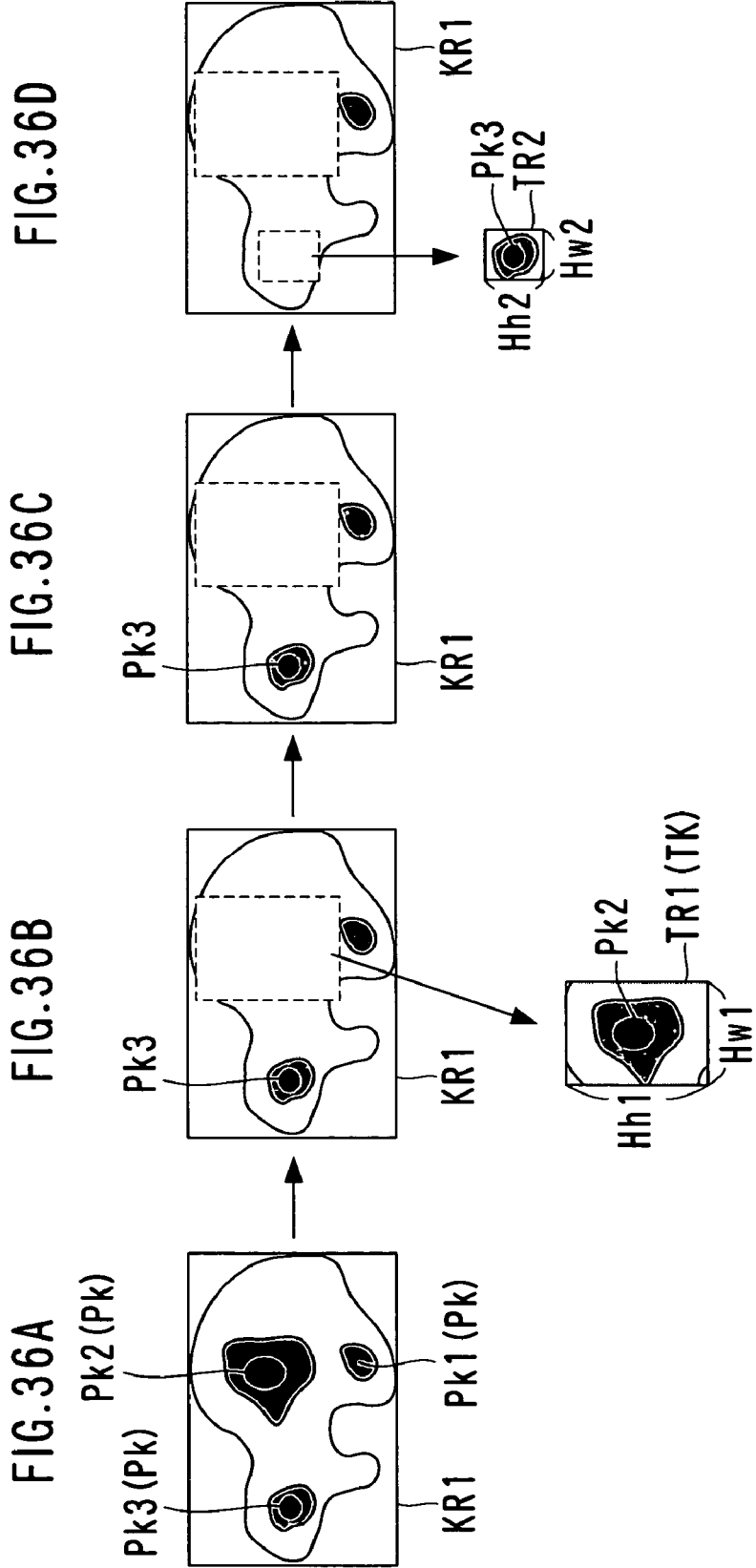

| RELIABILITY VALUES | | | | OPERATION METHOD NUMBER m |
|---|---|---|---|---|
| R1 | R2 | R3 | R4 | |
| 10 | 10 | 10 | 10 | 1 |
| 20 | 10 | 10 | 10 | 1 |
| 30 | 10 | 10 | 10 | 2 |
| ⋮ | ⋮ | ⋮ | ⋮ | ⋮ |

OBJECT DETECTION APPARATUS, OBJECT DETECTION METHOD AND COMPUTER PROGRAM PRODUCT

This application is based on Japanese Patent Application No. 2003-397999 filed on Nov. 27, 2003, the contents of which are hereby incorporated by reference.

BACKGROUND OF THE INVENTION

1. Field of the Invention

The present invention relates to an object detection apparatus or an object detection method for detecting a target object in an image.

2. Description of the Prior Art

Conventionally, a human body detection method is proposed, which is for a purpose of detecting a pedestrian or an incomer, personal identification, or framing.

A human body detection method is well known in which a camera is installed in a place where pedestrians often pass by, and images taken by the camera are analyzed so that an image area of a pedestrian is detected for detecting a pedestrian. As the method for detecting the image area of a pedestrian, a method utilizing a background differential, a method utilizing a movement differential (a time differential), a method calculating an optical flow, a method detecting a flesh color area, a method detecting an oval shape of a head, and a method detecting a part of a body such as an eye or a nose are proposed, for example.

The above-mentioned detection method has a disadvantage that there is a case where a pedestrian cannot be detected properly under the following condition.

For example, if a background image has a color similar to a skin of a human body or if an error is generated in a background reference image due to a change of lighting condition, a background differential cannot be calculated correctly. In this case, the method utilizing the background differential cannot detect a pedestrian properly. If a moving speed of a pedestrian is low or if a pedestrian is motionless, difference between two images is hardly showed off. In this case, it is possible that the method utilizing a movement differential (a time differential) and the method calculating an optical flow cannot detect a pedestrian properly.

If the background area contains much flesh color, the background area can be recognized incorrectly to be a human body area. If the pedestrian faces backward, there is a possibility that the method of detecting a flesh color area cannot detect the pedestrian properly since the flesh color area is small. If the pedestrian wears a cap, glasses, sunglasses or a mask, there is a possibility that the method of detecting an oval shape of a head or the method of detecting a part of a body such as an eye or a nose cannot detect the pedestrian since the part is hidden.

As a method that can solve the above-mentioned problems, the method described in Japanese unexamined patent publication No. 11-316845 is proposed. According to this method, a plurality of subject extractions having different characteristics are performed, and the subjects extracted in each subject extraction are combined. If the result of the combination does not satisfy predetermined acceptance criteria, auxiliary subject extractions having different characteristics are further performed. Then, the result of the combination and the extraction results by the auxiliary subject extractions are used for extracting a main subject.

However, according to this method, if the main subject extracted by using the result of the combination and the extraction results by the auxiliary subject extractions still does not satisfy the predetermined acceptance criteria, further auxiliary subject extractions having different characteristics are required to perform. Therefore, depending on reliability of the result of the original subject extraction, a lot of additional auxiliary subject extractions are required to be performed. In addition, it is necessary always to decide whether or not the result of the combination satisfies the predetermined acceptance criteria. Therefore, the number of processes to be performed simultaneously (i.e., for one frame) increases, and a processing speed becomes very slow as a result.

SUMMARY OF THE INVENTION

An object of the present invention is to provide an apparatus and a method that can detect an object correctly without slowing down a processing speed substantially even if an environment for taking images or other conditions are changed.

An object detection apparatus according to the present invention is an apparatus for detecting a target object in an image. The object detection apparatus includes an image input portion for entering a shot image that is taken by a camera, a plurality of feature detection portions for detecting features of the shot image by using different methods, a shooting condition obtaining portion for obtaining information indicating conditions for shooting by the camera, a reliability calculation portion for calculating reliability of the feature that is detected by each of the feature detection portions in the conditions indicated by the information obtained by the shooting condition obtaining portion, and an object detection portion for detecting the object in the shot image in accordance with the features detected respectively by one or more of the plural feature detection portions from the shot image and the reliability of the feature calculated by the reliability calculation portion.

Preferably, the feature detection portion detects the feature as a feature quantity, and the object detection portion detects the object in accordance with the feature quantity of each feature that has a weight corresponding to reliability of each feature. In another preferable embodiment, the apparatus further includes a reliability memory portion for memorizing the reliability of the feature calculated by the reliability calculation portion, in which the reliability calculation portion calculates the reliability of the feature at a predetermined timing, and the object detection portion detects the object in the shot image in accordance with the latest feature memorized in the reliability memory portion.

If the object is a human body, the feature detection portion may be, for example, a section for calculating a matching degree between the shot image and a template having a semiellipse shape for obtaining the feature, a section for detecting a likelihood of a flesh color in each of sectioned areas of a pixel plane of the shot image for obtaining the feature, a section for detecting a likelihood of a hair color in the area of the shot image for obtaining the feature, or a section for calculating a matching degree between the shot image and a template having shapes of shoulders for obtaining the feature.

Alternatively, the apparatus includes a reliability calculation portion for calculating reliability of the feature that is detected by each of the feature detection portions in the conditions, an operation method decision portion for deciding an operation method for detecting the object in accordance with the reliability calculated by the reliability calculation portion, of each feature detected by each of the feature detection portions, and an object detection portion for detecting the object in the shot image in accordance with the features detected respectively by one or more of the plural feature detection portions and the operation method decided by the operation method decision portion.

In the present invention, "conditions for shooting by the camera" mean various conditions concerning shooting including an environment of the camera or a state of setting. For example, the conditions include an environment such as luminance of lighting, shadows or traffic in the passage where the monitoring is performed, and setting such as a camera speed (frame rate), zooming, panning or tilting. A result of head detection in the previous frame or an evaluation about head detection by an operator (such as an evaluation whether or not the result of designation by the operator who viewed the image and the result of decision by the apparatus are correct) is also included in the conditions for shooting by the camera.

The operation method in the present invention may be, for example, an operation method utilizing an arithmetical mean method, an operation method utilizing a geometrical mean method, an operation method utilizing a function for selecting a maximum value or a minimum value, an operation method utilizing a four fundamental operations or a logical operation, or an operation method using a square root.

According to the present invention, a target object can be detected correctly without substantial drop in processing speed even if an environment for taking images or other conditions are changed.

BRIEF DESCRIPTION OF THE DRAWINGS

FIG. 4C is a diagram showing an example of a structure of a feature quantity operation portion.

FIGS. 29A and 29B are charts showing an example of a relationship among changes of various shooting conditions, phenomena and influences accompanying the changes.

FIG. 31 is a chart showing an example of a reliability conversion table.

FIGS. 36A-36D are diagrams showing an example of a method of generating a head detection result plane.

FIG. 40 is a chart showing an example of an operation method selection table.

DESCRIPTION OF THE PREFERRED EMBODIMENTS

Hereinafter, the present invention will be explained more in detail with reference to embodiments and drawings.

Figure 1:
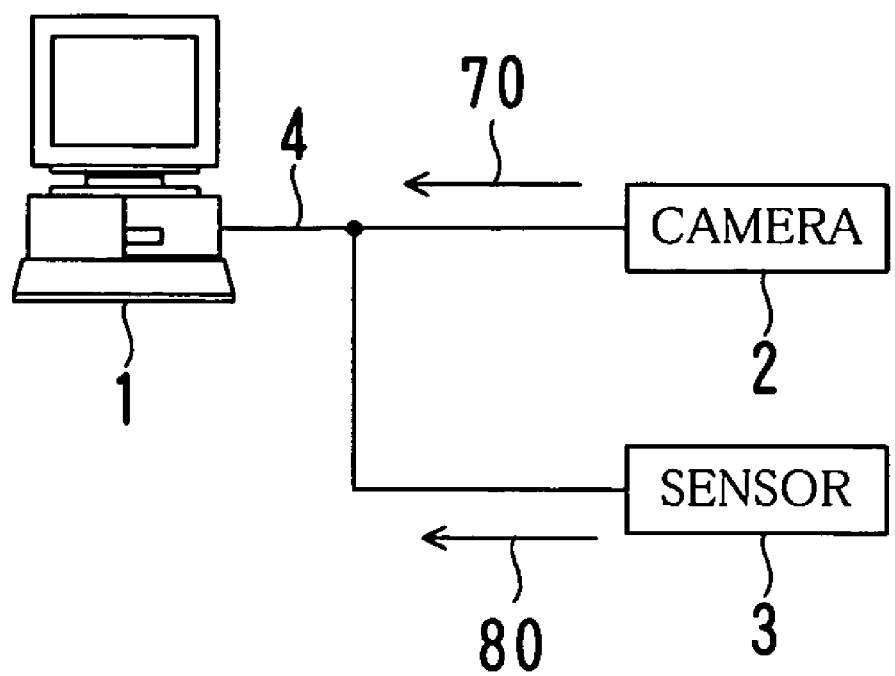
FIG. 1 is a diagram showing an example of a general structure of a monitoring system.
Figure 2A:
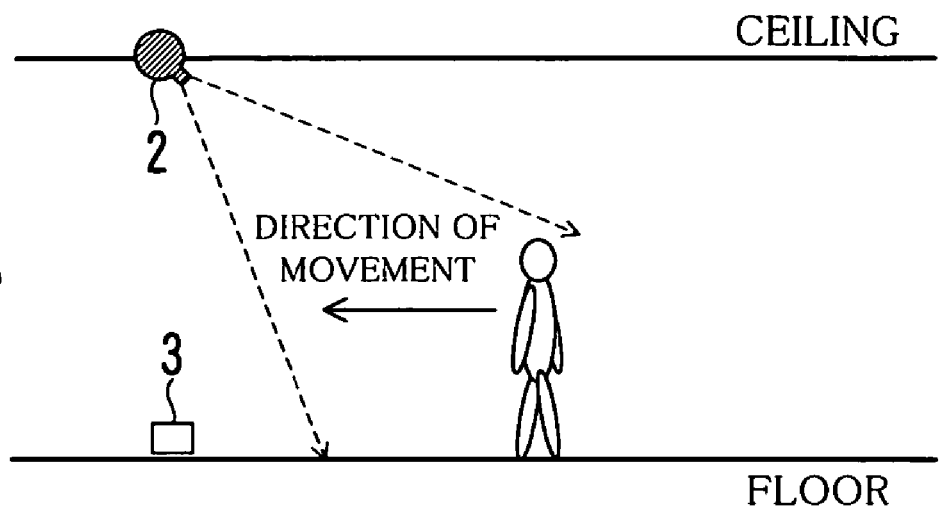
FIGS. 2A and 2B are diagrams showing an example of a position and a posture of a video camera, and a shooting situation.
Figure 2B:
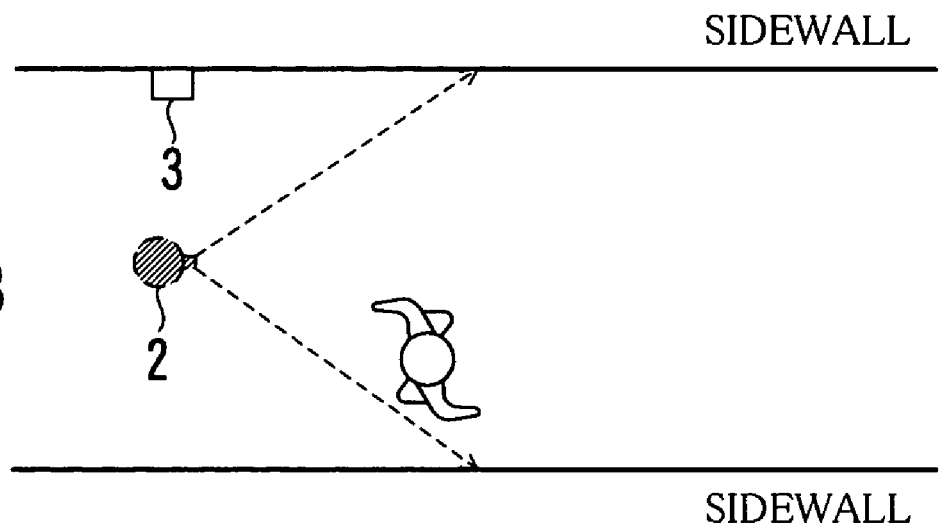
Figure 3:
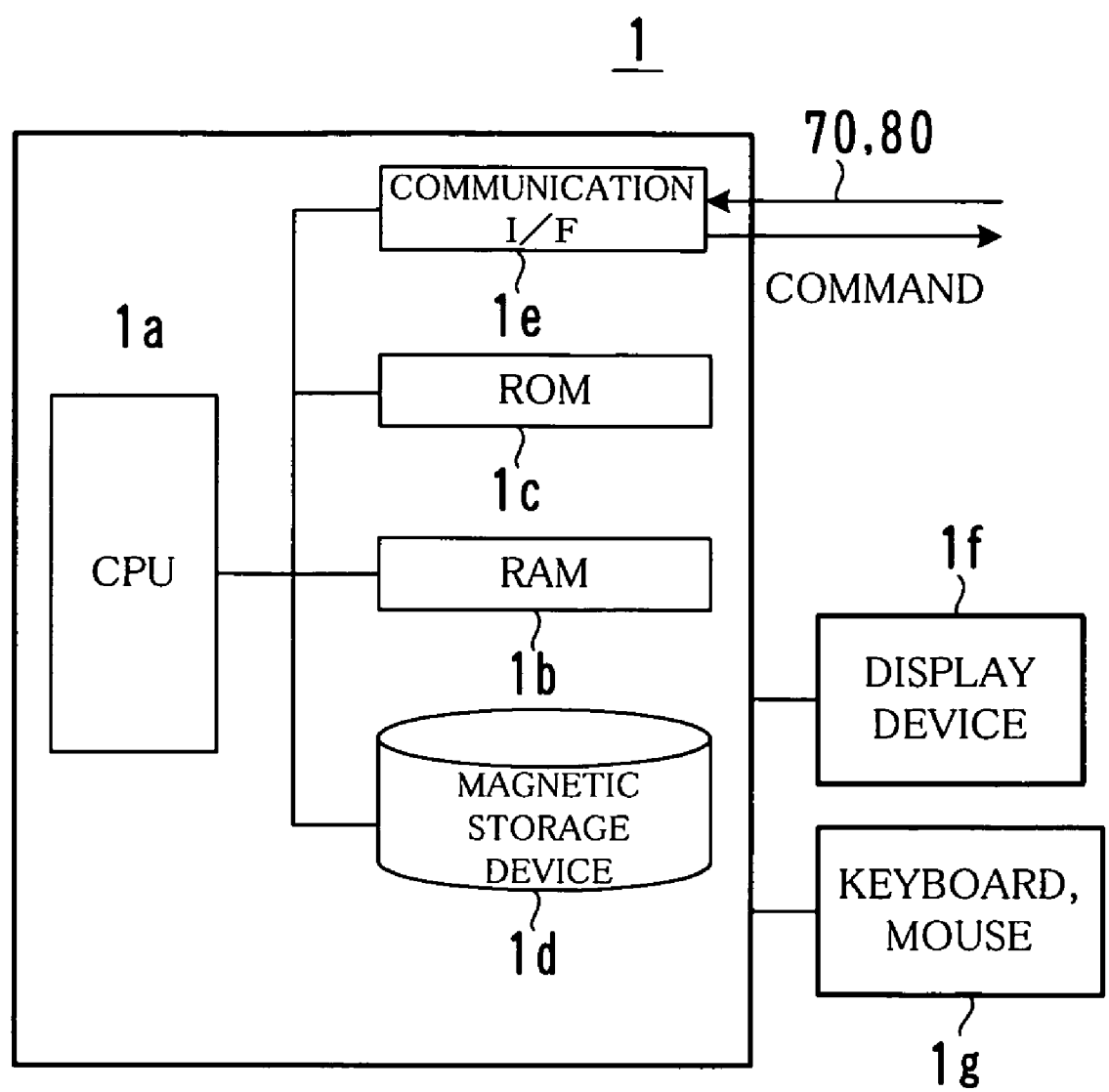
FIG. 3 is a diagram showing an example of a hardware structure of a human body detection apparatus.
Figure 4A:
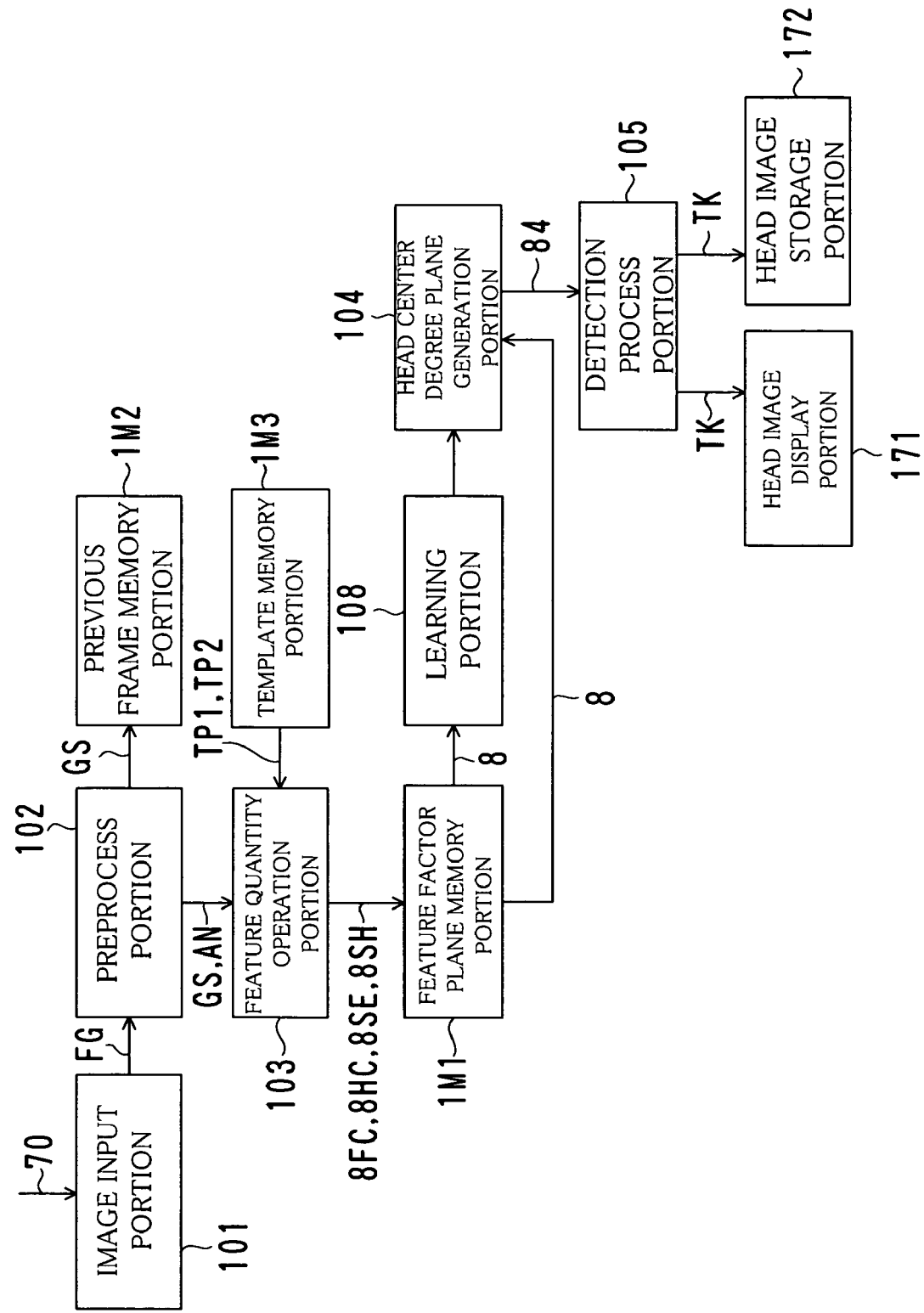
FIG. 4A is a diagram showing an example of a functional structure of the human body detection apparatus.
Figure 4B:
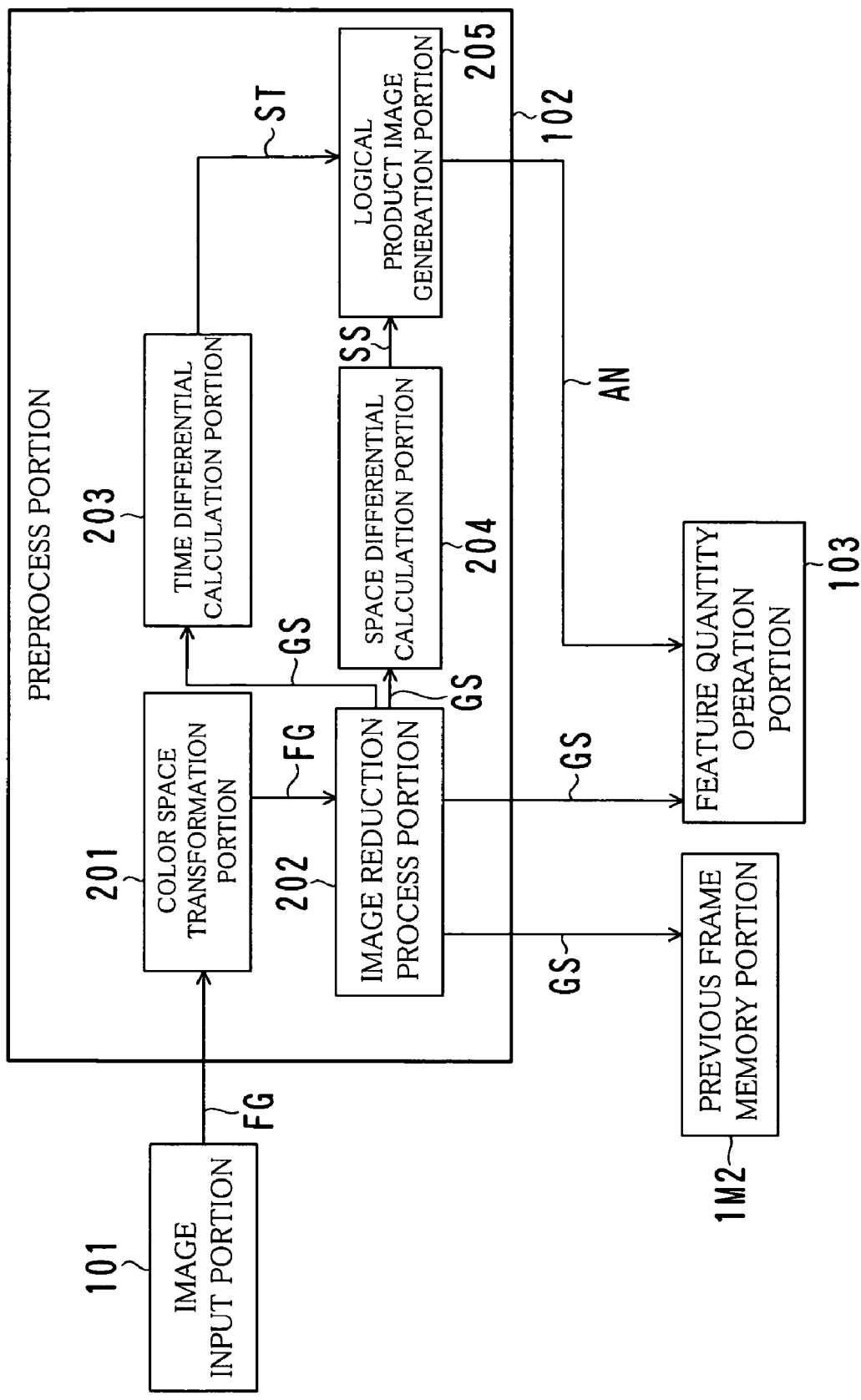
FIG. 4B is a diagram showing an example of a structure of a preprocess portion.
Figure 4D:
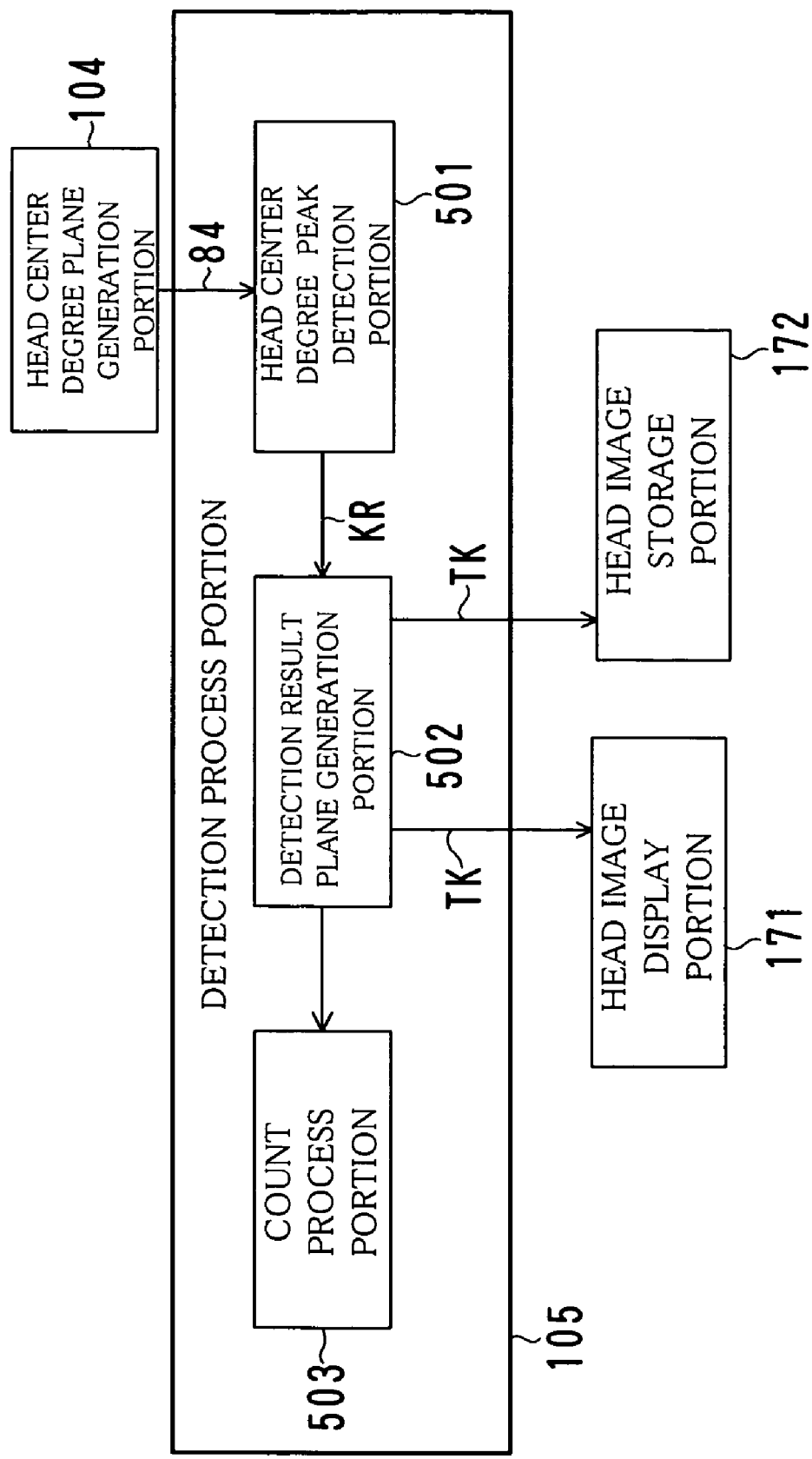
FIG. 4D is a diagram showing an example of a structure of a detection process portion.

FIG. 1 is a diagram showing an example of a general structure of a monitoring system 100, FIGS. 2A and 2B are diagrams showing an example of a position and a posture of a video camera 2, and a shooting situation, FIG. 3 is a diagram showing an example of a hardware structure of a human body detection apparatus 1, FIG. 4A is a diagram showing an example of a functional structure of the human body detection apparatus 1, FIG. 4B is a diagram showing an example of a structure of a preprocess portion, FIG. 4C is a diagram showing an example of a structure of a feature quantity operation portion, and FIG. 4D is a diagram showing an example of a structure of a detection process portion.

As shown in FIG. 1, the monitoring system 100 includes a human body detection apparatus 1 according to the present invention, a video camera 2, a sensor 3, and a communication line 4. The human body detection apparatus 1, the video camera 2 and the sensor 3 are connected to each other via the communication line 4. As the communication line 4, an LAN, a public telephone network, a private line or the Internet can be used.

The video camera 2 has an image sensor such as a CCD, an optical system, an interface for sending data to and receiving data from an external device, and a control circuit. The video camera 2 takes an image and sends it to the human body detection apparatus 1 as image data 70.

This video camera 2 is installed at a passage or a gateway of a shopping facility such as a supermarket or a department store, or a facility like a shop, an underground mall, a building or an event floor, at a ceiling or other position where people walk through, as shown in FIG. 2. Hereinafter, the case will be explained where the video camera 2 is installed at a passage of a facility for monitoring a state of the passage. Furthermore, it is supposed that the video camera 2 is set to the following conditions. Namely, a horizontal angle of view is set to approximately 60 degrees, a distance to an object to be detected (a subject), i.e., a shooting distance is approximately 3-5 meters, resolution of an output image is 640×480 pixels (so-called VGA). It is supposed that the passage has a width of approximately 1.0-1.5 meters.

The sensor 3 is used for detecting a state, e.g., brightness, speed of a pedestrian or the number of pedestrians in the passage to be monitored. The sensor 3 sends detection result information 80 to the human body detection apparatus 1 at a regular interval (e.g., at an interval that an operator preset) or at a timing when something is detected. What is used as the sensor 3 specifically will be explained later.

The human body detection apparatus 1 includes a CPU 1*a*, a RAM 1*b*, a ROM 1*c*, a magnetic storage device (a hard disk drive) 1*d*, a communication interface 1*e*, a display device 1*f* and an input device 1*g* such as a mouse or a keyboard as shown in FIG. 3.

In the magnetic storage device 1*d*, programs and data are installed for realizing functions of an image input portion 101, a preprocess portion 102, a feature quantity operation portion 103, a head center degree plane generation portion 104, a detection process portion 105, a head image display portion 171, a head image storage portion 172, a learning portion 108, a feature factor plane memory portion 1M1, a previous frame memory portion 1M2, and a template memory portion 1M3 as shown in FIG. 4A. These programs and data are loaded into the RAM 1*b* if necessary, and the program is executed by the CPU 1*a*.

This human body detection apparatus 1 is installed in a control room of a facility, so that a guard can monitor a state of the passage staying in the control room. Furthermore, a head of pedestrian whose picture is in an image taken by the video camera 2 is detected and is displayed in an enlarged manner. Also, the image of the head can be stored. As the human body detection apparatus 1, a workstation or a personal computer may be used.

Hereinafter, processes of portions of the human body detection apparatus 1 shown in FIG. 4A when detecting a position of a head center (e.g., a tip of nose) of a pedestrian from an image taken by the video camera 2 will be explained.

[Input and a Preprocess of an Image of an Object to be Detected]

Figure 5:
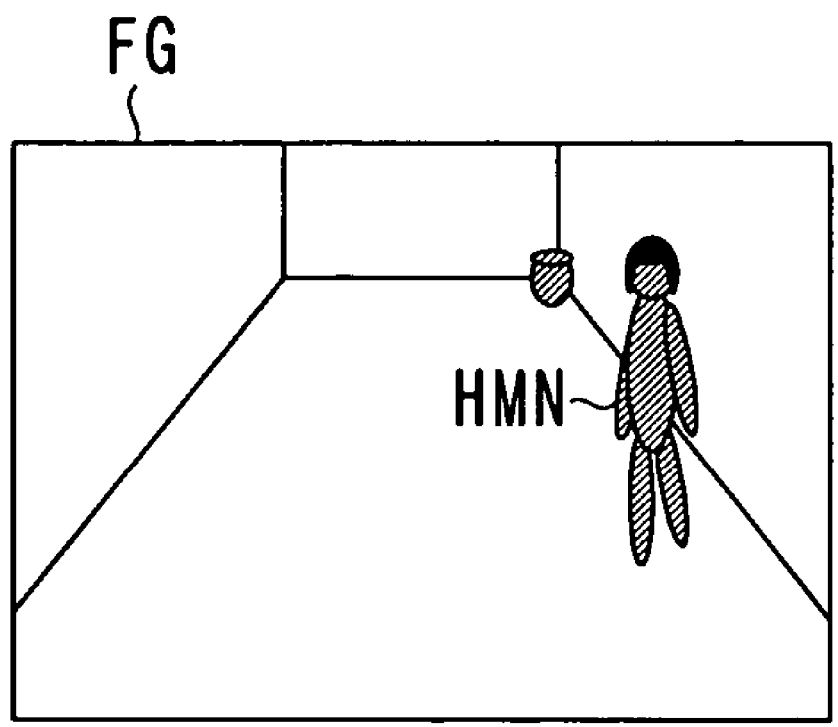
FIG. 5 is a diagram showing an example of an image taken by a video camera.
Figure 6:
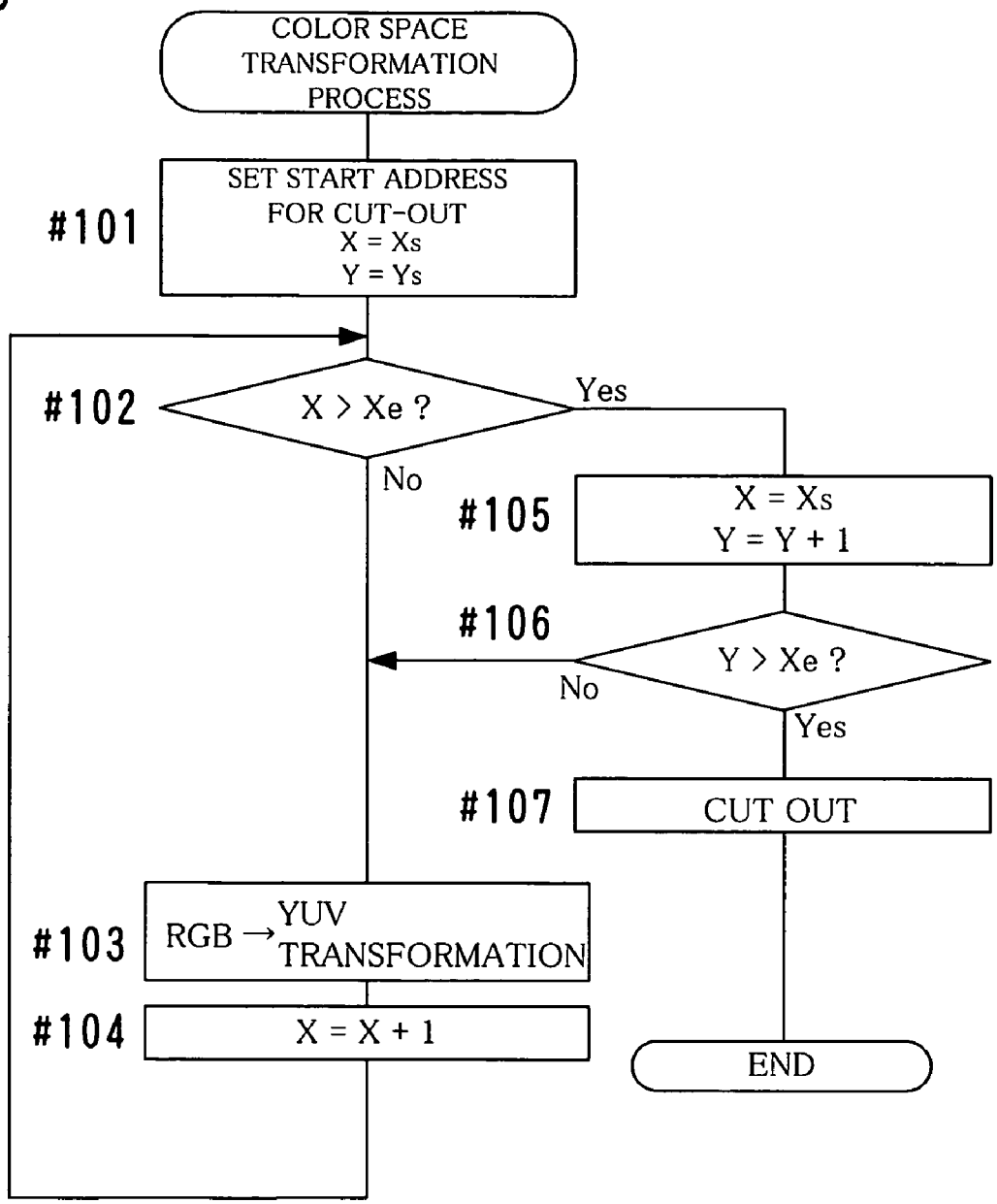
FIG. 6 is a flowchart explaining an example of a flow of a color space transformation process.
Figure 7:
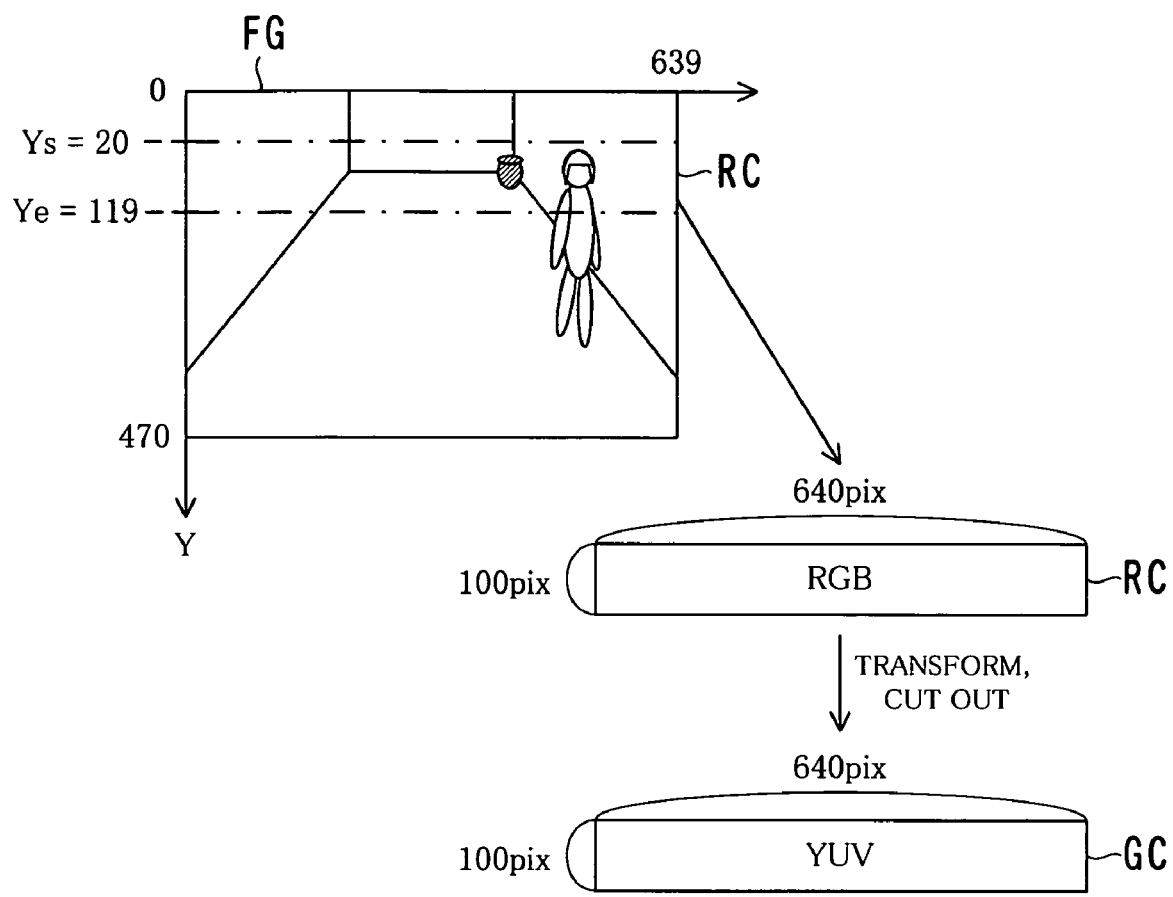
FIG. 7 is a diagram showing an example of a method of generating a cut-out image.
Figure 8:
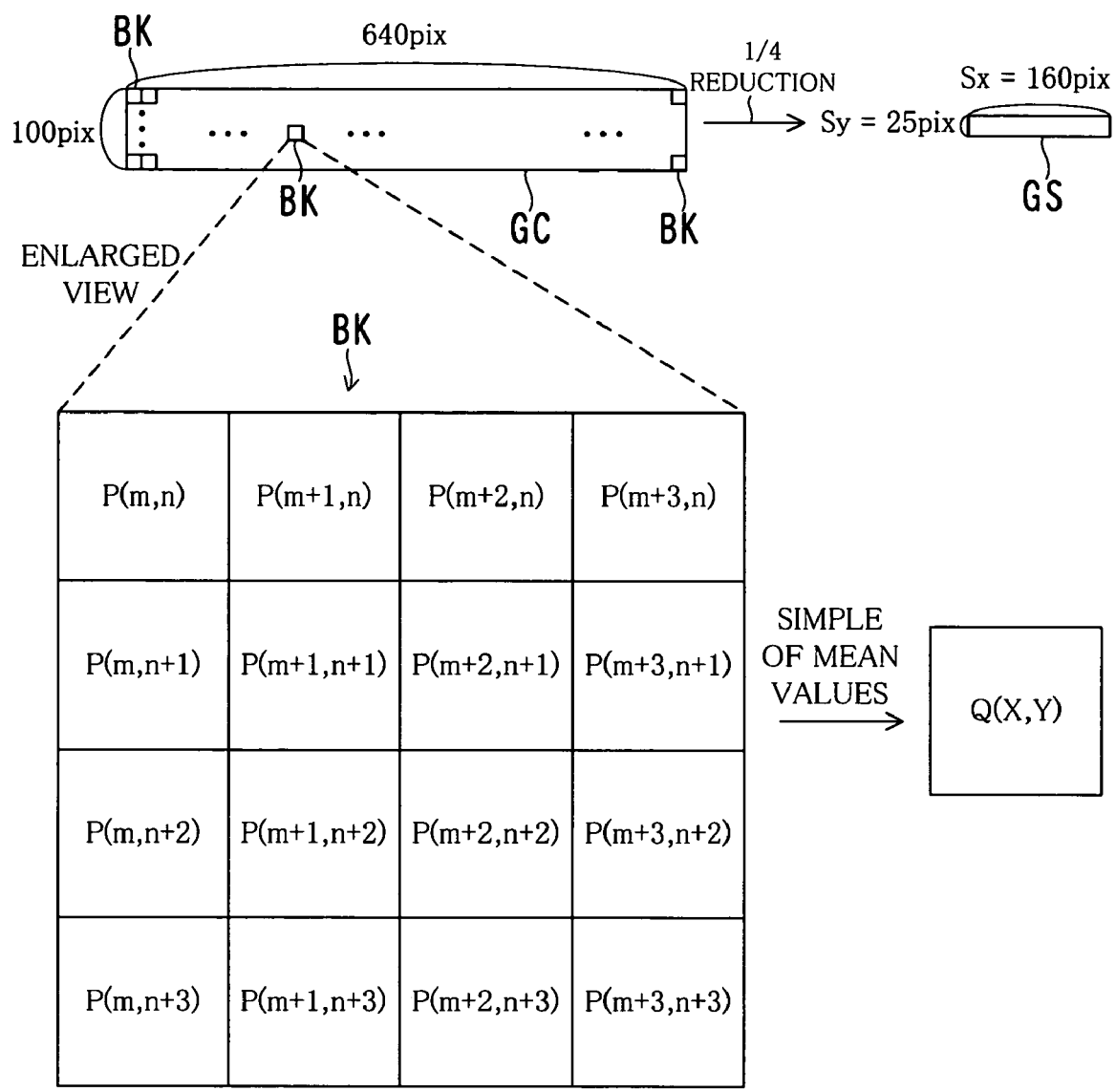
FIG. 8 is a diagram showing an example of a method of generating a cut-out thumbnail image.
Figure 9:
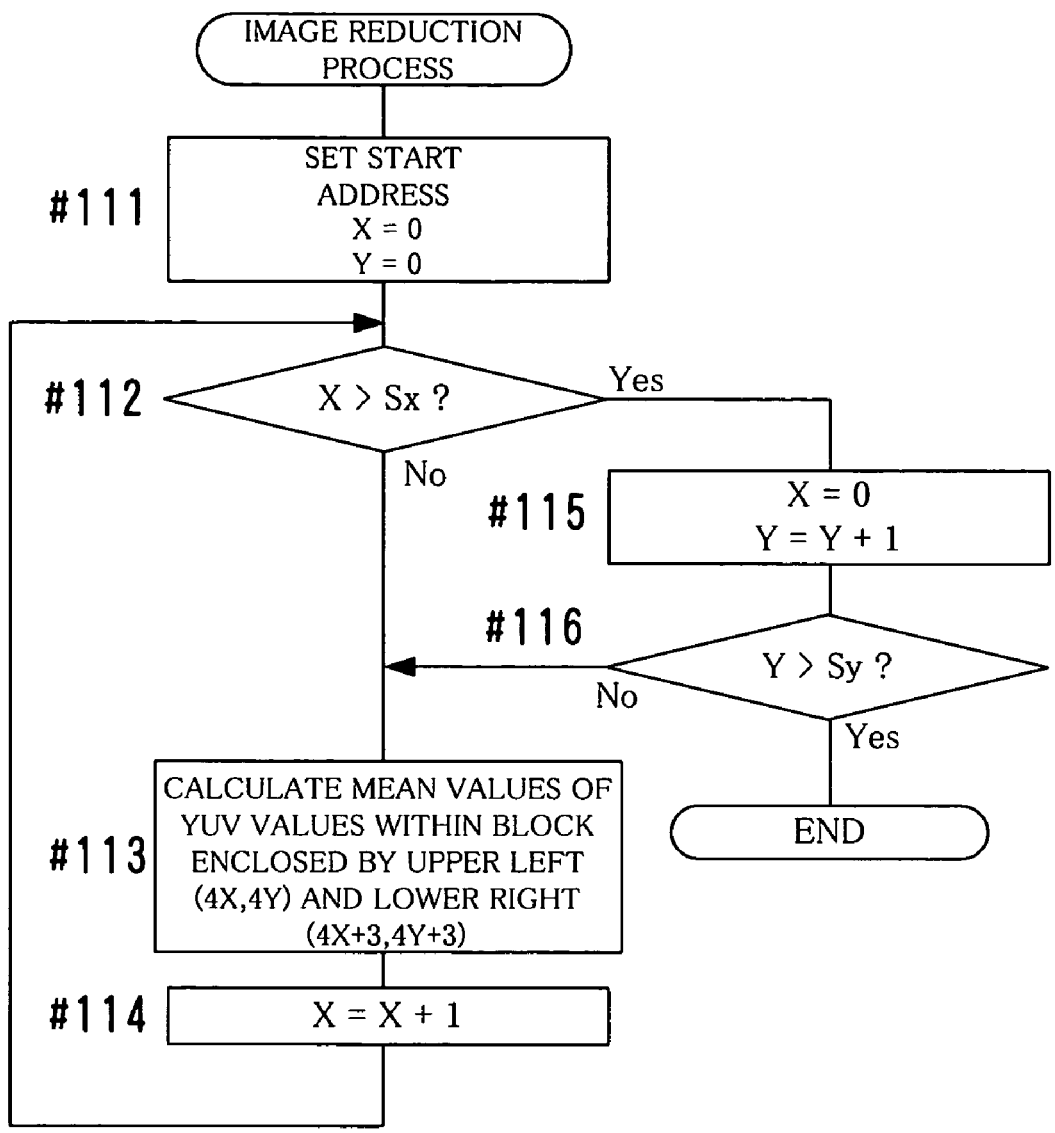
FIG. 9 is a flowchart explaining an example of a flow of an image reduction process.
Figure 10:
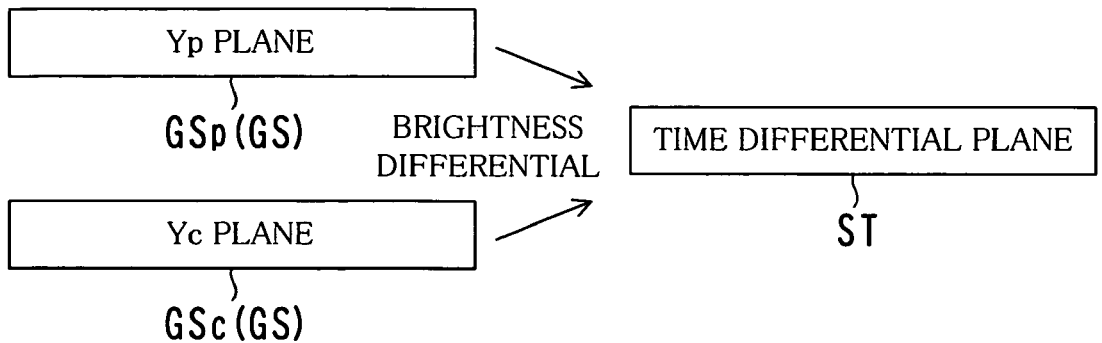
FIG. 10 is a diagram showing an example of a method of generating a time differential plane.
Figure 11:
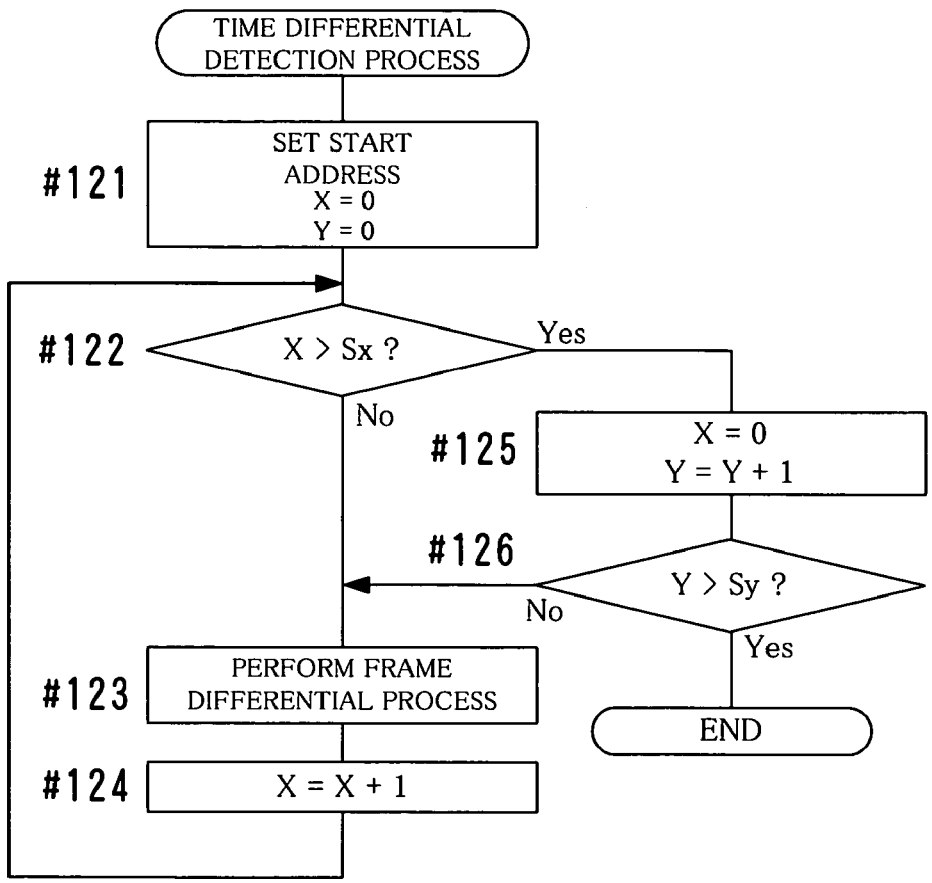
FIG. 11 is a flowchart explaining an example of a flow of a time differential detection process.
Figure 12:
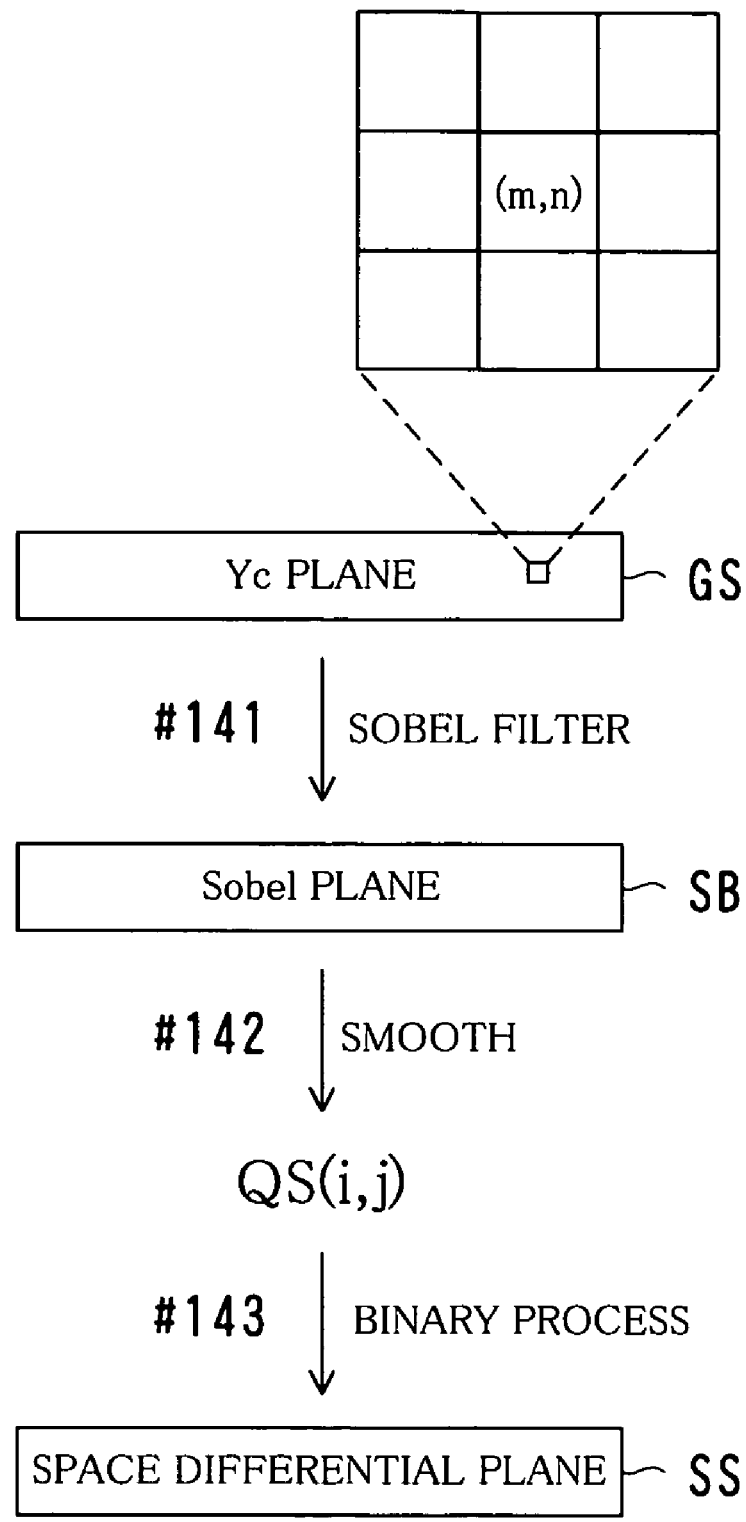
FIG. 12 is a diagram showing an example of a method for generating a space differential plane.
Figure 13:
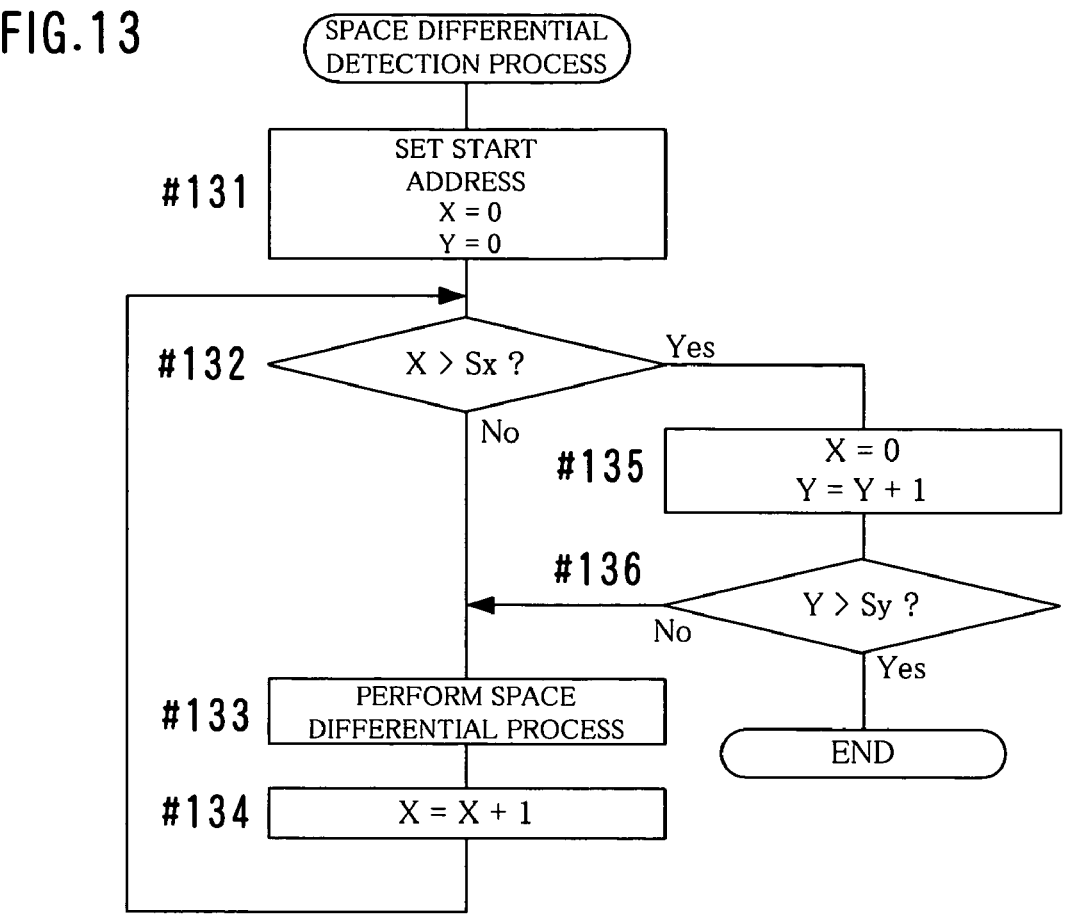
FIG. 13 is a flowchart explaining an example of a flow of a space differential detection process.
Figure 14:
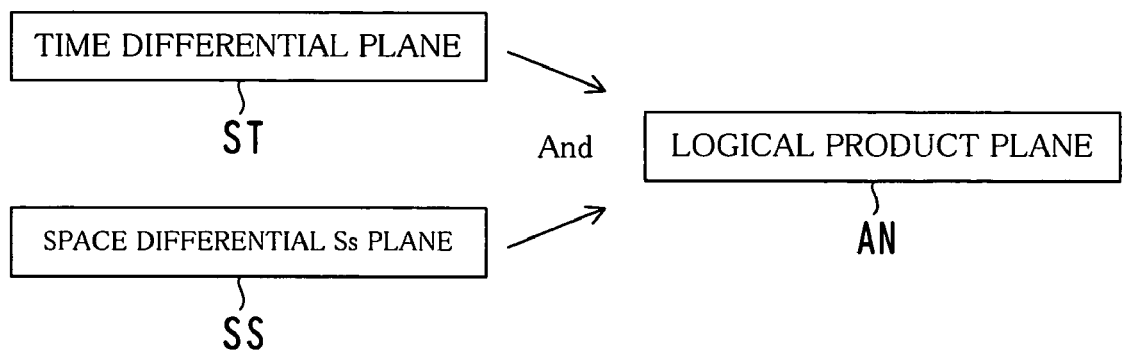
FIG. 14 is a diagram showing an example of a method of generating a logical product plane.
Figure 15:
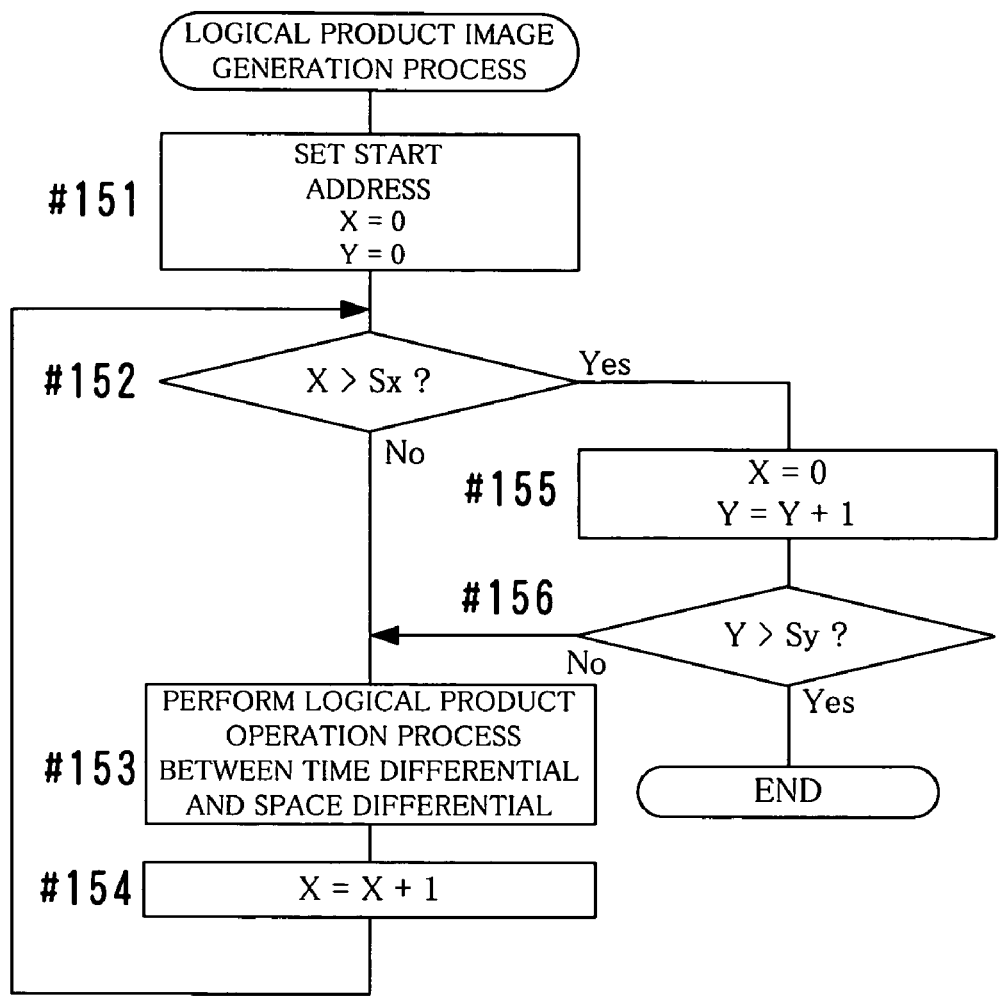
FIG. 15 is a flowchart explaining an example of a flow of a logical product image generation process.
Figure 16:
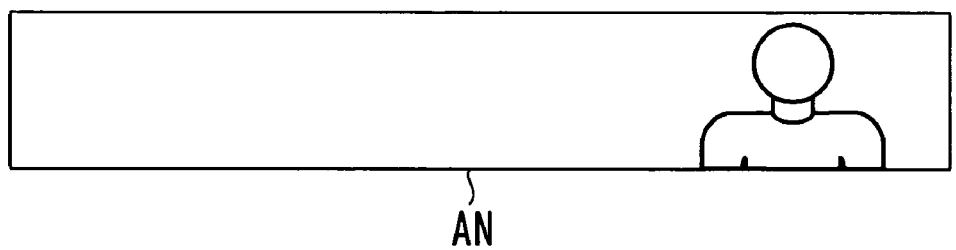
FIG. 16 is a diagram showing an example of a logical product plane.

FIG. 5 is a diagram showing an example of an image FG taken by a video camera 2, FIG. 6 is a flowchart explaining an example of a flow of a color space transformation process, FIG. 7 is a diagram showing an example of a method of generating a cut-out image GC, FIG. 8 is a diagram showing an example of a method of generating a cut-out thumbnail image GS, FIG. 9 is a flowchart explaining an example of a flow of an image reduction process, FIG. 10 is a diagram showing an example of a method of generating a time differential plane ST, FIG. 11 is a flowchart explaining an example of a flow of a time differential detection process, FIG. 12 is a diagram showing an example of a method for generating a space differential plane SS, FIG. 13 is a flowchart explaining an example of a flow of a space differential detection process, FIG. 14 is a diagram showing an example of a method of generating a logical product plane AN, FIG. 15 is a flowchart explaining an example of a flow of a logical product image generation process, and FIG. 16 is a diagram showing an example of a logical product plane AN.

The image input portion 101 shown in FIG. 4A performs a reception process of image data 70 received from the video camera 2. Thus, an image FG of frames corresponding to a camera speed of the video camera 2 (e.g., 30 frames per second) is obtained as shown in FIG. 5.

As shown in FIG. 4B, the preprocess portion 102 includes a color space transformation portion 201, an image reduction process portion 202, a time differential calculation portion 203, a space differential calculation portion 204 and a logical product image generation portion 205, so as to perform a process of preparation that is necessary for a process of calculating a position of head center of a pedestrian HMN in the image FG.

The color space transformation portion 201 performs a process of transforming data of the image into YUV color space data if the image FG entered by the image input portion 101 is an image of a RGB color space. This process is performed in accordance with a procedure shown in FIGS. 6 and 7.

An image area in the image FG that is considered to include a head of a pedestrian HMN is set as shown in FIG. 7 (#101 in FIG. 6). Hereinafter, this image area is referred to as a "noted image area RC". The noted image area RC is set in accordance with a position and a posture of the video camera 2 and a size of a human head. Alternatively, it is set by referring to the image that was taken by the video camera 2. In the human body detection apparatus 1 of this embodiment, a size and a shape of the noted image area RC is defined to be a rectangle having 640×100 pixels. Accordingly, it is sufficient to set only a start address of the noted image area RC (coordinates of the pixel at the upper left corner). For example, as shown in FIG. 7, if only the coordinates (Xs, Ys) of the start address are given like (0, 20), the end address, i.e., coordinates (Xe, Ye) of the pixel at the lower right corner are determined automatically, so that the noted image area RC is set.

Concerning the image FG, RGB values of the pixel are transformed into YUV values while scanning the image FG from the pixel at the coordinates (Xs, Ys) in the X axis direction (the horizontal direction in the image) one by one pixel (No in #102, #103 and #104). This transformation can be performed by assigning RGB values of the pixel into the equation (1), for example.

$$\begin{pmatrix} Y \\ U \\ V \end{pmatrix} = \frac{1}{100} \left[ \begin{pmatrix} 30 & 59 & 11 \\ -17 & -33 & 50 \\ 50 & -42 & -8 \end{pmatrix} \begin{pmatrix} R \\ G \\ B \end{pmatrix} + \begin{pmatrix} 0 \\ 12750 \\ 12750 \end{pmatrix} \right] \qquad (1)$$

After finishing the transformation for pixels on the line whose Y-coordinate is Ys (Yes in #102), the lower neighboring line whose Y-coordinate is Ys+1 is noted (#105), and RGB values are transformed into YUV values concerning pixels on the line one by one pixel in the same way (No in #102, #103 and #104). Hereinafter, until the transformation is completed for the coordinates (Xe, Ye), the above-mentioned process is repeated.

Then, after the transformation is finished for all pixels (Yes in #106), an image of the noted image area RC that was transformed into YUV values is cut out so that the cut-out image GC is generated (#107). Furthermore, it is possible to cut out the noted image area RC first from the image FG and then to perform the transformation process (#103) on all pixels in the noted image area RC.

If the image FG entered by the video camera 2 is an image having the YUV color space, the transformation process in the steps #102-#106 is not performed, but the process in the step #101 for setting the noted image area RC and the process in the step #107 for cutting out are performed so as to obtain the cut-out image GC.

With reference to FIG. 4B again, the image reduction process portion 202 reduces the cut-out image GC to a predetermined reduction ratio (1/4 in this embodiment) as shown in FIG. 8, so as to perform a process of generating a cut-out thumbnail image GS. This process is performed in accordance with the procedure as shown in FIG. 9.

The cut-out image GC is sectioned into blocks BK having 4×4 pixels, and the coordinates (X, Y) of the start address are set to (0, 0) (#111 in FIG. 9). Pixel values (YUV values) of pixels that belong to the block BK having coordinates (4X, 4Y) and (4X+3, 4Y+3) at both ends of diagonal line among pixels in the cut-out image GC is assigned into the equation (2).

$$Q(X, Y) = \frac{1}{16} \left( \sum_{i=0}^{3} \sum_{j=0}^{3} P(m+i, n+j) \right) \qquad (2)$$

Here, m=4X, and n=4Y. Q(X, Y) are YUV values of the pixel at the coordinates (X, Y) in the cut-out thumbnail image GS, and P(m, n) are YUV values of the pixel at the coordinates (m, n) in the cut-out image GC.

In this way, mean values (simple mean values) of YUV values of the block BK at the upper left corner in the cut-out image GC are calculated (#113). The calculated values become YUV values of the pixel at the upper left corner in the cut-out thumbnail image GS.

Concerning 159 blocks BK arranged at the right adjacent to the block BK, mean values of YUV values are calculated in the same way (#113 and #114), so as to obtain YUV values of other 159 pixels on the first line in the horizontal direction in the cut-out thumbnail image GS.

Concerning the second through the 100-th line in the cut-out thumbnail image GS, YUV values are obtained by calculating means values of YUV values of pixels in the second through the 25-th stages of blocks BK in the cut-out image GC (#112-#116). Then, the process is finished when YUV values of the pixel at the lower right corner in the cut-out thumbnail image GS are calculated (Yes in #116).

In this way, the cut-out image GC is reduced so as to generate the cut-out thumbnail image GS. The generated cut-out thumbnail image GS is used for a process of generating a flesh color chromaticity plane, a process of generating a hair color chromaticity plane, a process of calculating a time differential and a process of calculating a space differential, which will be explained later. Furthermore, the generated cut-out thumbnail image GS is memorized in the previous frame memory portion 1M2 if necessary as being explained later.

With reference to FIG. 4B again, the time differential calculation portion 203 calculates a time differential (a frame differential) between a brightness value of the generated cut-out thumbnail image GS by using the image reduction process portion 202 (referred to as a "present cut-out thumbnail image GSc" in the explanation with reference to FIG. 10) and a brightness value of a cut-out thumbnail image GS before (e.g., two frames before) (referred to as a "antecedent cut-out thumbnail image GSp" in the explanation with reference to FIG. 10), so as to generate the time differential plane ST as shown in FIG. 10. It can be said that the generated time differential plane ST is a time differential image of brightness between the present cut-out thumbnail image GSc and the antecedent cut-out thumbnail image GSp. In this embodiment, a value of each pixel in the time differential plane ST is expressed by a binary value. Therefore, the time differential plane ST can be expressed as a monochrome image. The generation of the time differential plane ST is performed in accordance with the procedure shown in FIG. 11.

First, coordinates (X, Y) of the start address is set to (0, 0) (#121). A difference of brightness, i.e., a difference of Y component of YUV values (brightness differential) of the pixel at (0, 0) between the present cut-out thumbnail image GSc and the antecedent cut-out thumbnail image GSp is calculated in accordance with the following equation (3).

$$\text{Buffer} = abs|Yc(i, j) - Yp(i, j)| \qquad (3)$$

Here, Yc(i, j) and Yp(i, j) are Y component of YUV values of the pixel at coordinates (i, j) in the present cut-out thumbnail image GSc and the antecedent cut-out thumbnail image GSp, respectively. The expression "abs|A|" means an absolute of A.

The obtained Buffer is made a binary value. For example, if Buffer exceeds a threshold level THst, the brightness differential between the images is made "1". If Buffer is less than the threshold level THst, the brightness differential is made "0" (#123). If YUV values have 256 gradation steps, the threshold level THst is set to "10", for example.

Hereinafter, a brightness differential between corresponding pixels is calculated in the same way while shifting one by one pixel in the X axis direction (the horizontal direction in the image) (#123 and #124). After the brightness differential between pixels at the right end is calculated (Yes in #122), shifting by one pixel in the Y axis direction (the vertical direction in the image) (#125), a brightness differential is calculated in the same way from the left end to the right end (#123 and #124). Then, when the brightness differential of the pixel at the lower right corner is calculated (Yes in #126), the process is finished. In this way, the time differential plane ST is generated.

With reference to FIG. 4B again, the space differential calculation portion 204 calculates a space differential of the cut-out thumbnail image GS generated by the image reduction process portion 202 in accordance with the procedure shown in FIGS. 12 and 13, so as to generate a space differential plane SS (a space differential image).

A space differential process is performed on each pixel in the cut-out thumbnail image GS (#133 in FIG. 13). For example, similarly to the case of the time differential detection process explained with reference to FIG. 11, the space differential process is performed on the pixel at the upper left corner to the pixel at the lower right corner sequentially.

In the space differential process, pixel values of the pixel to be processed and the surrounding eight pixels are assigned into the following equations (4) and (5) first as shown in FIG. 12. In other words, a SOBEL filter is used.

$$Q1(i, j) = \left(\sum_{m=-1}^{1}\sum_{n=-1}^{1}(K1(m, n) \times P(i+m, j+n))\right) \quad (4)$$

$$Q2(i, j) = \left(\sum_{m=-1}^{1}\sum_{n=-1}^{1}(K2(m, n) \times P(i+m, j+n))\right) \quad (5)$$

Here, P(i, j) is a brightness (Y component) value of a pixel at (i, j) in the cut-out thumbnail image GS. Q1(i, j) and Q2(i, j) are output results respectively by a horizontal edge detection vertical SOBEL filter and a vertical edge detection horizontal SOBEL filter on the pixel at (i, j) in the cut-out thumbnail image GS. Furthermore, K1(m, n) and K2(m, n) are the horizontal edge detection vertical SOBEL filter and the vertical edge detection horizontal SOBEL filter having the values as shown below.

$$K1(m, n) = \begin{pmatrix} -1 & -2 & -1 \\ 0 & 0 & 0 \\ 1 & 2 & 1 \end{pmatrix},$$

$$K2(m, n) = \begin{pmatrix} -1 & 0 & 1 \\ -2 & 0 & 2 \\ -1 & 0 & 1 \end{pmatrix}$$

The calculated values of Q1(i, j) and Q2(i, j) are assigned into the equation (6) so as to calculate a Sobel plane SB (#141 in FIG. 12).

$$Sbl(i, j) = \sqrt{(Q1(i,j)^2 + Q2(i,j)^2)} \quad (6)$$

This Sobel plane SB is smoothed by filtering using a smoothing filter shown in the equation (7) below (#142).

$$QS(i, j) = \left(\sum_{m=-2}^{2}\sum_{n=-2}^{2}(KS(m, n) \times Sbl(i+m, j+n))\right) \quad (7)$$

Here, QS(i, j) is brightness (Y component) values of a pixel at the coordinates (i, j) on the smoothed Sobel plane SB, and KS(m, n) is a smoothing filter having the value as shown below.

$$KS(m, n) = \frac{1}{25}\begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}$$

Then, a binary process is performed in accordance with the following equation (8) (#143).

$$SS(i, j) = \begin{cases} 1 & (Buffer > THss) \\ 0 & (Buffer \leq THss) \end{cases} \quad (8)$$

Here, Buffer=QS(i, j)−Sbl(i, j). THss is a threshold level. THss is set to a value "6", for example.

According to this operation, the space differential plane SS is generated. Furthermore, the space differential plane SS is expressed as a monochrome image.

With reference to FIG. 4B again, the logical product image generation portion 205 generates the logical product plane AN, as shown in FIGS. 14 and 15, by calculating a logical product of pixel values (binary values) of corresponding pixels between the time differential plane ST generated by the time differential calculation portion 203 and the space differential plane SS generated by the space differential calculation portion 204.

Edges (contours) of only moving objects appear in this logical product plane AN as shown in FIG. 16. Namely, it can be said that the logical product plane AN is an edge image (a contour image) of moving objects. A procedure for generating the logical product plane AN is as shown in the flowchart of FIG. 15. Furthermore, the flowchart shown in FIG. 15 is explaining that a logical product operation process (#153) is performed so as to scan from the pixel at the upper left corner to the pixel at the lower right corner sequentially. This point of performing the process in this order is the same as the case shown in FIGS. 11 and 13, so a detail explanation is omitted. It is the same in following FIGS. 19, 20, 25, 26 and others.

[Generation of Feature Factor Plane]

Figure 17A:
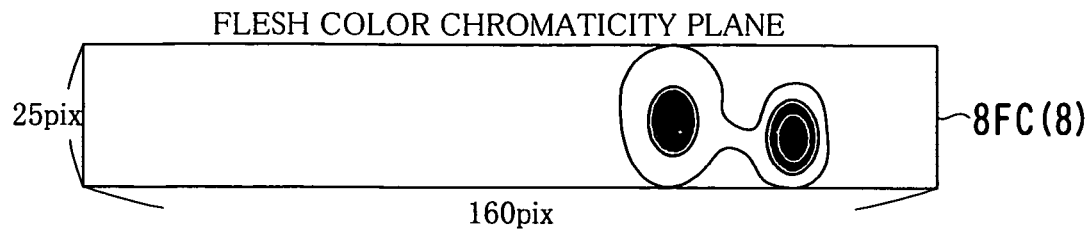
FIGS. 17A-17D are diagrams showing an example of four sorts of a feature factor plane.
Figure 17B:
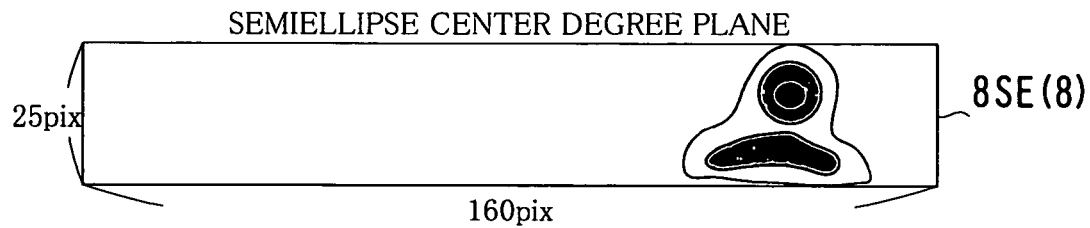
Figure 17C:
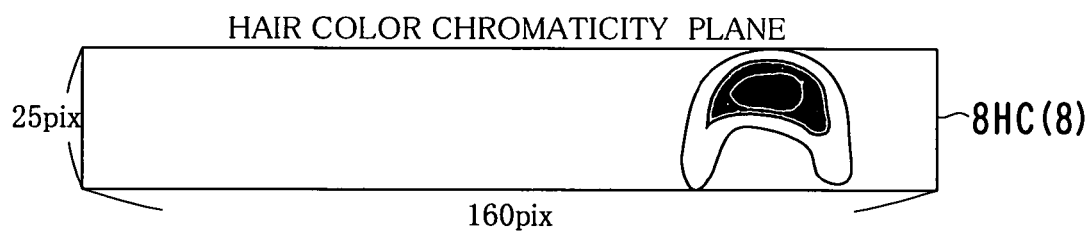
Figure 17D:
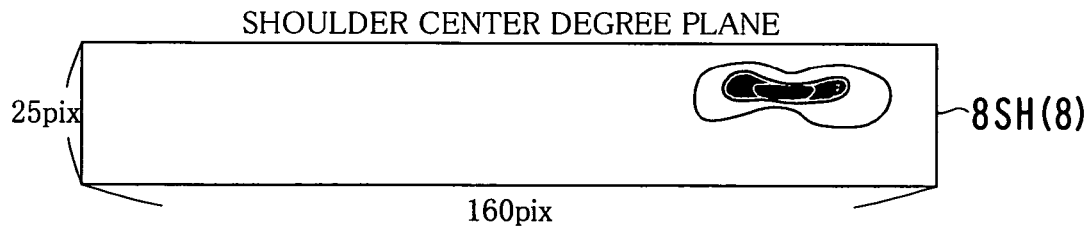
Figure 18:
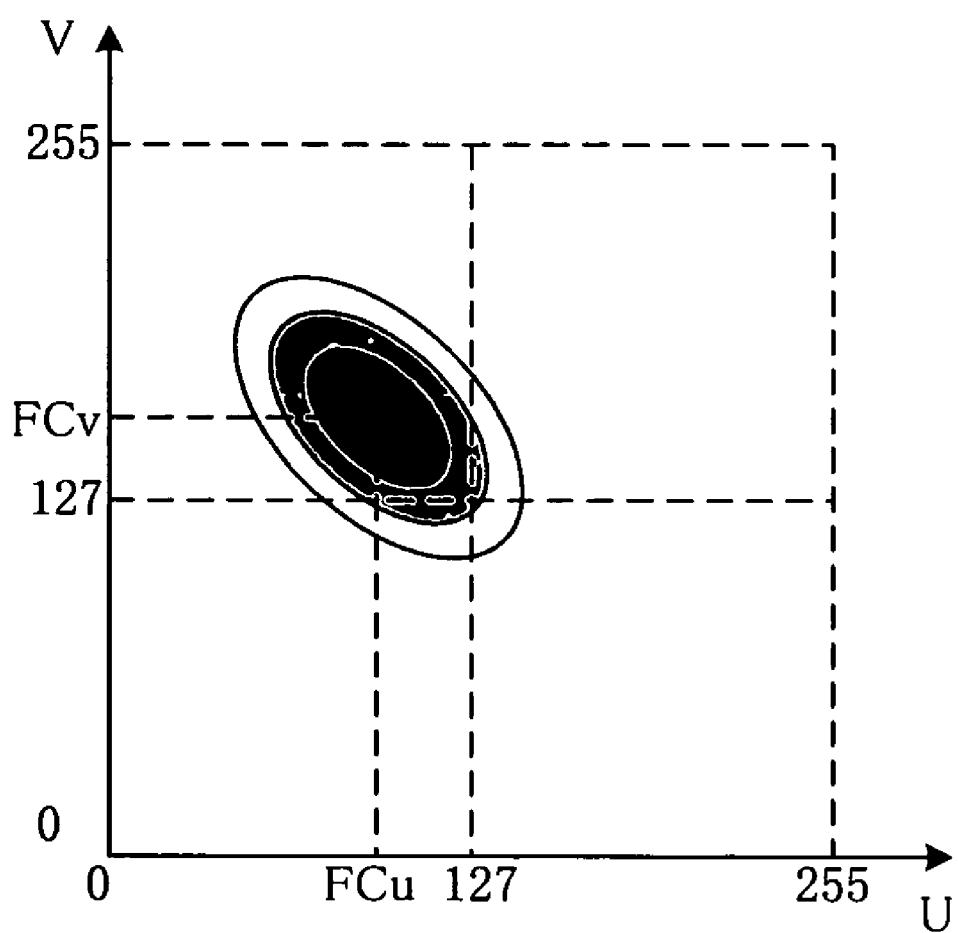
FIG. 18 is a diagram showing a relationship between a flesh color chromaticity and values of U and V components of a pixel value in a YUV space.
Figure 19:
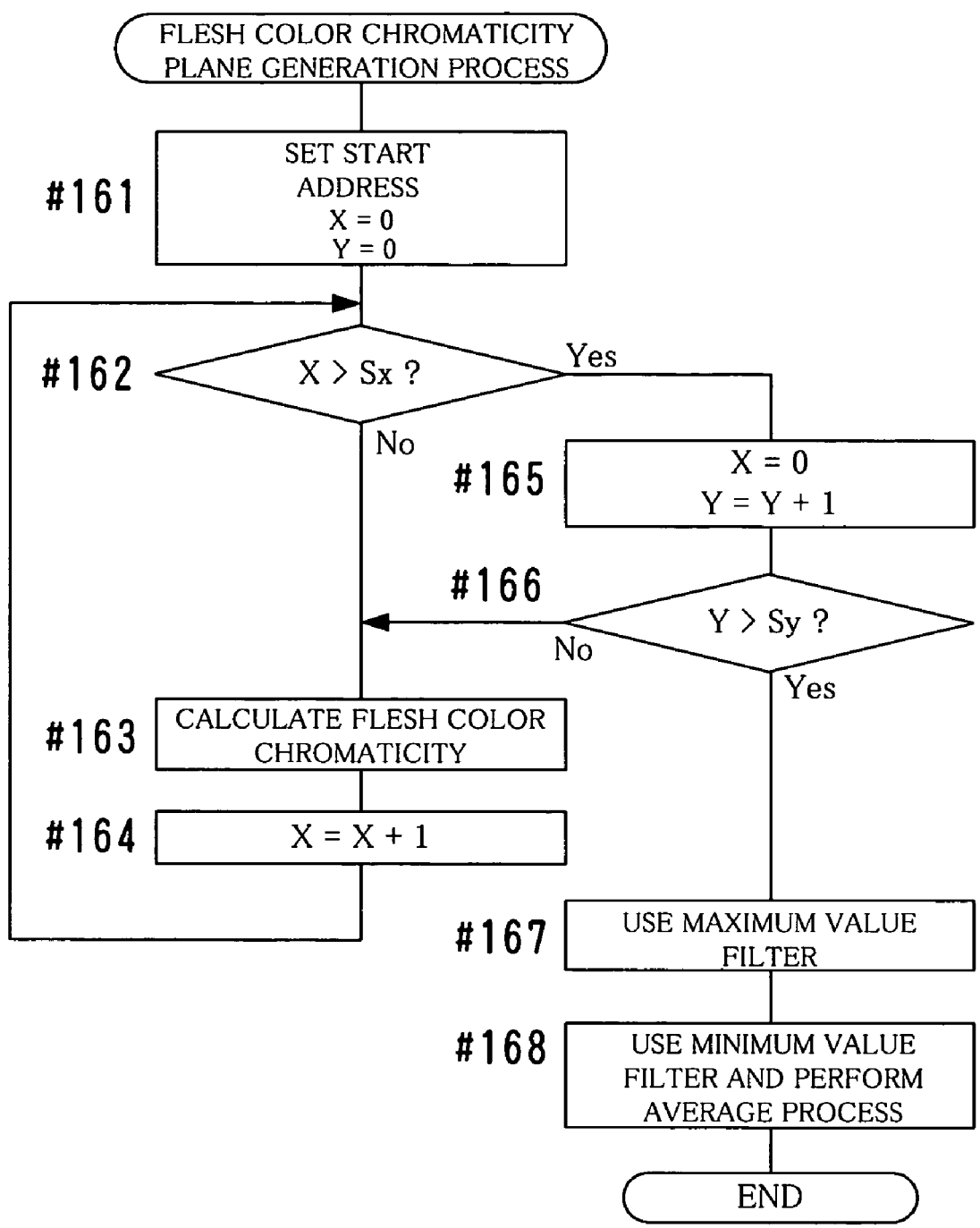
FIG. 19 is a flowchart explaining an example of a flow of a flesh color chromaticity plane generation process.
Figure 20:
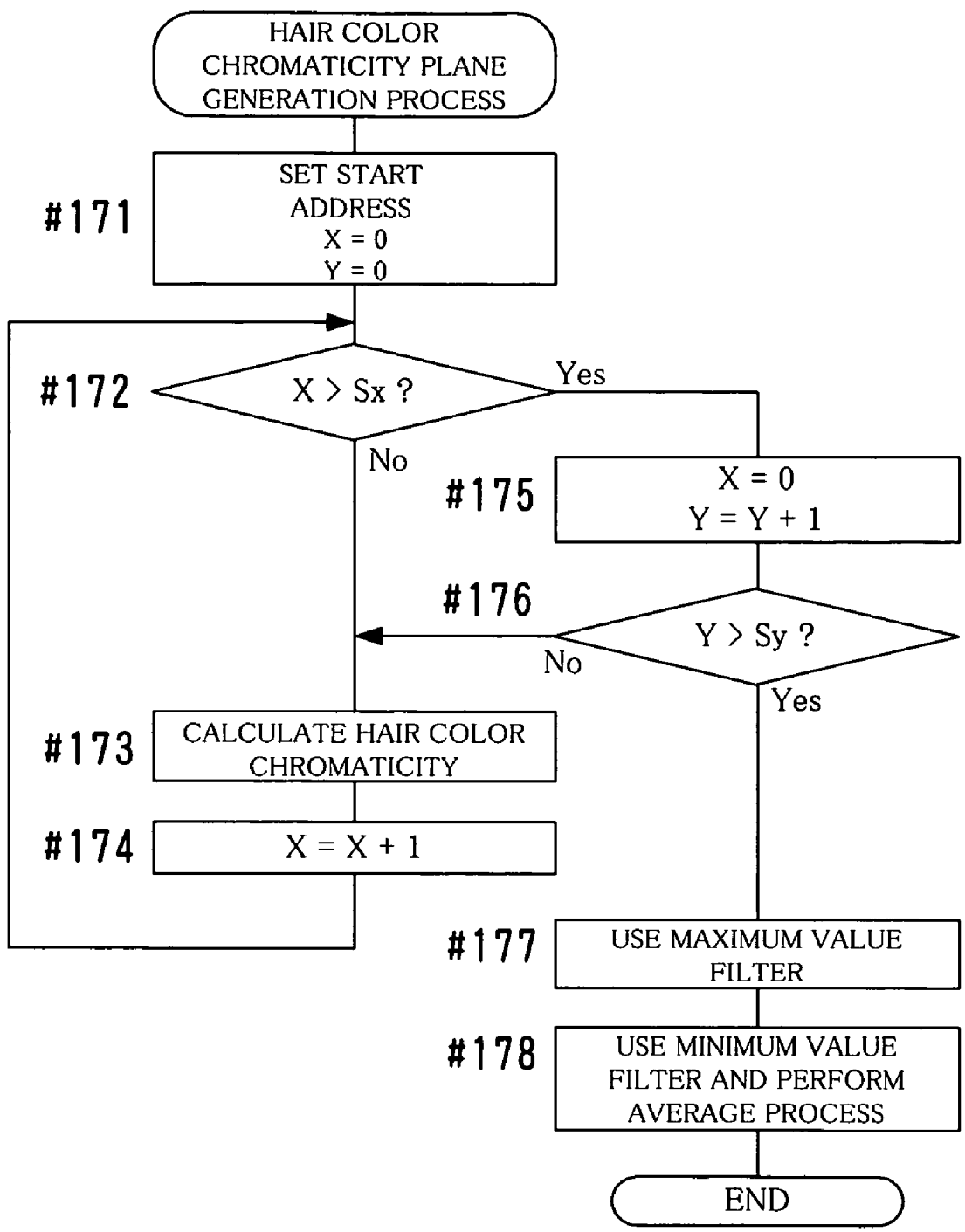
FIG. 20 is a flowchart explaining an example of a flow of a hair color chromaticity plane generation process.
Figure 21:
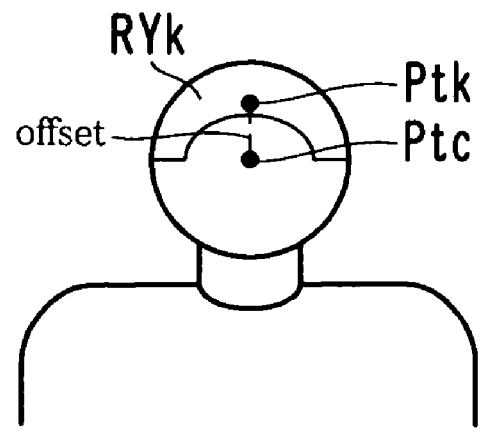
FIG. 21 is a diagram explaining about an offset correction.
Figure 22:
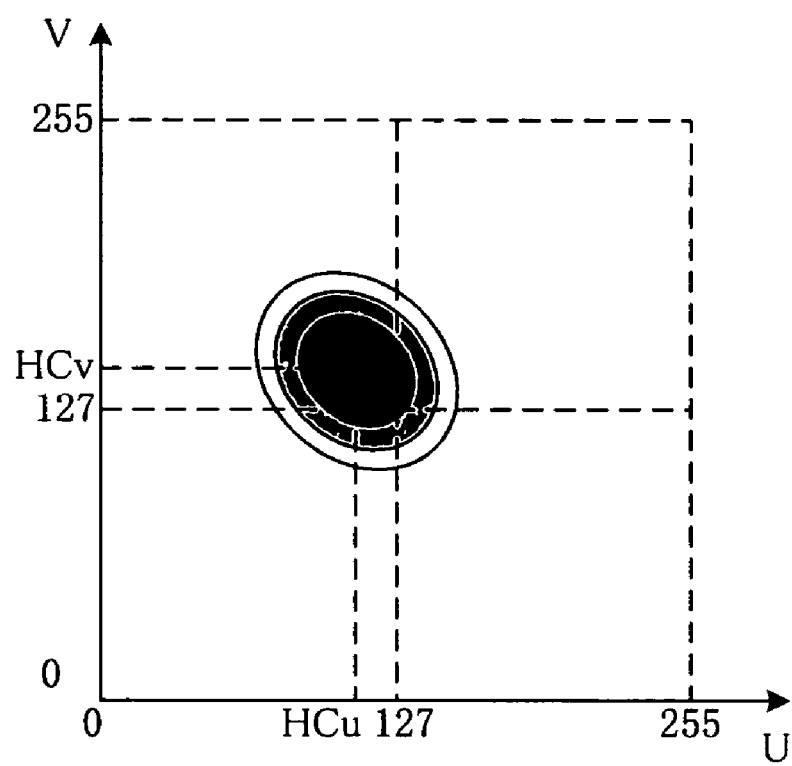
FIG. 22 is a diagram showing a relationship between a hair color chromaticity and values of U and V components of a pixel value in a YUV space.
Figure 23A:
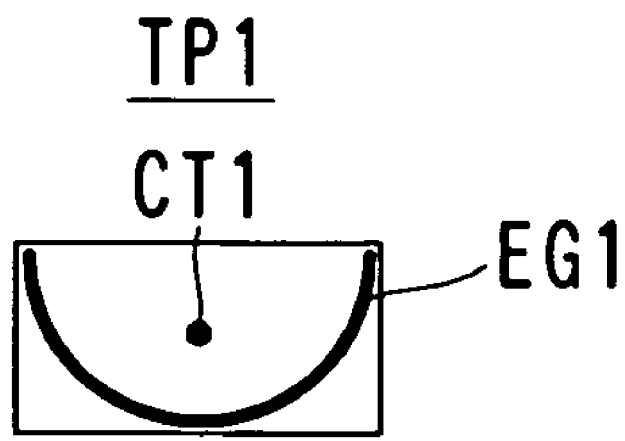
FIGS. 23A and 23B are diagrams showing an example of templates.
Figure 23B:
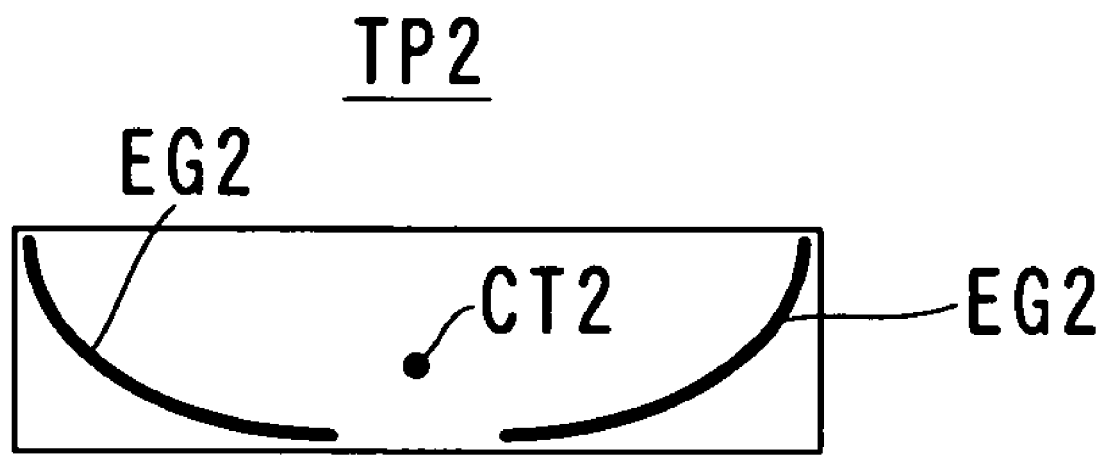
Figure 24A:
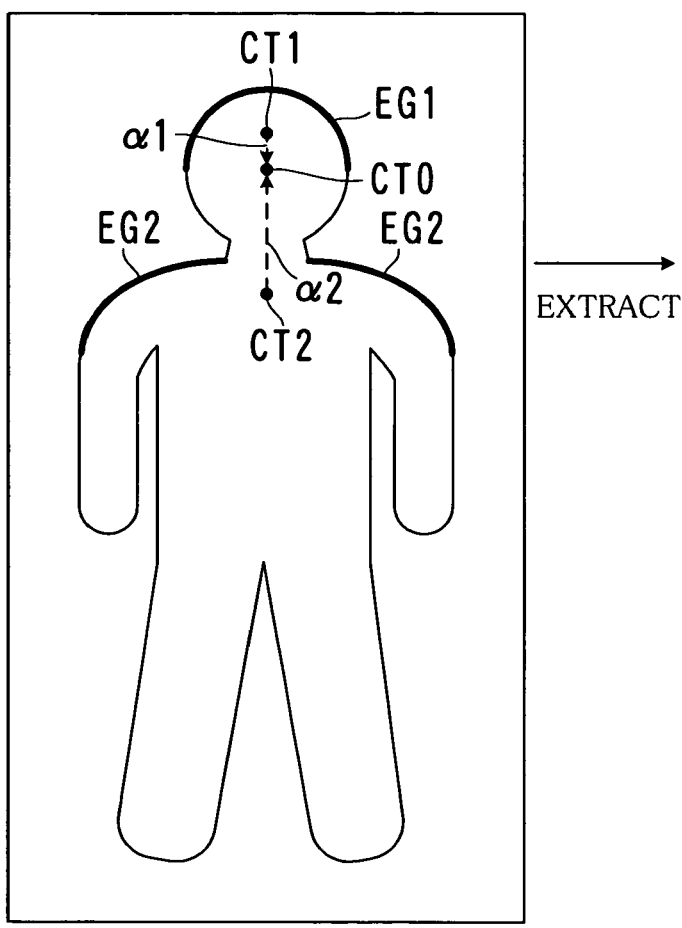
FIGS. 24A-24C are diagrams showing an example of a method of generating templates.
Figure 24B:
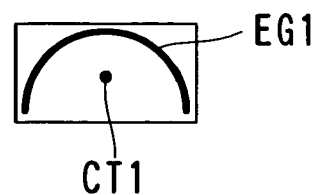
Figure 24C:
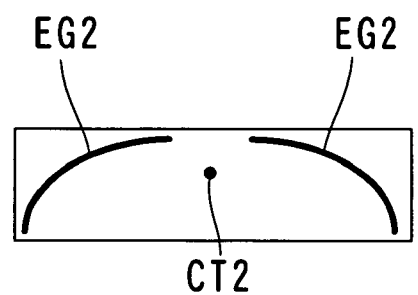
Figure 25:
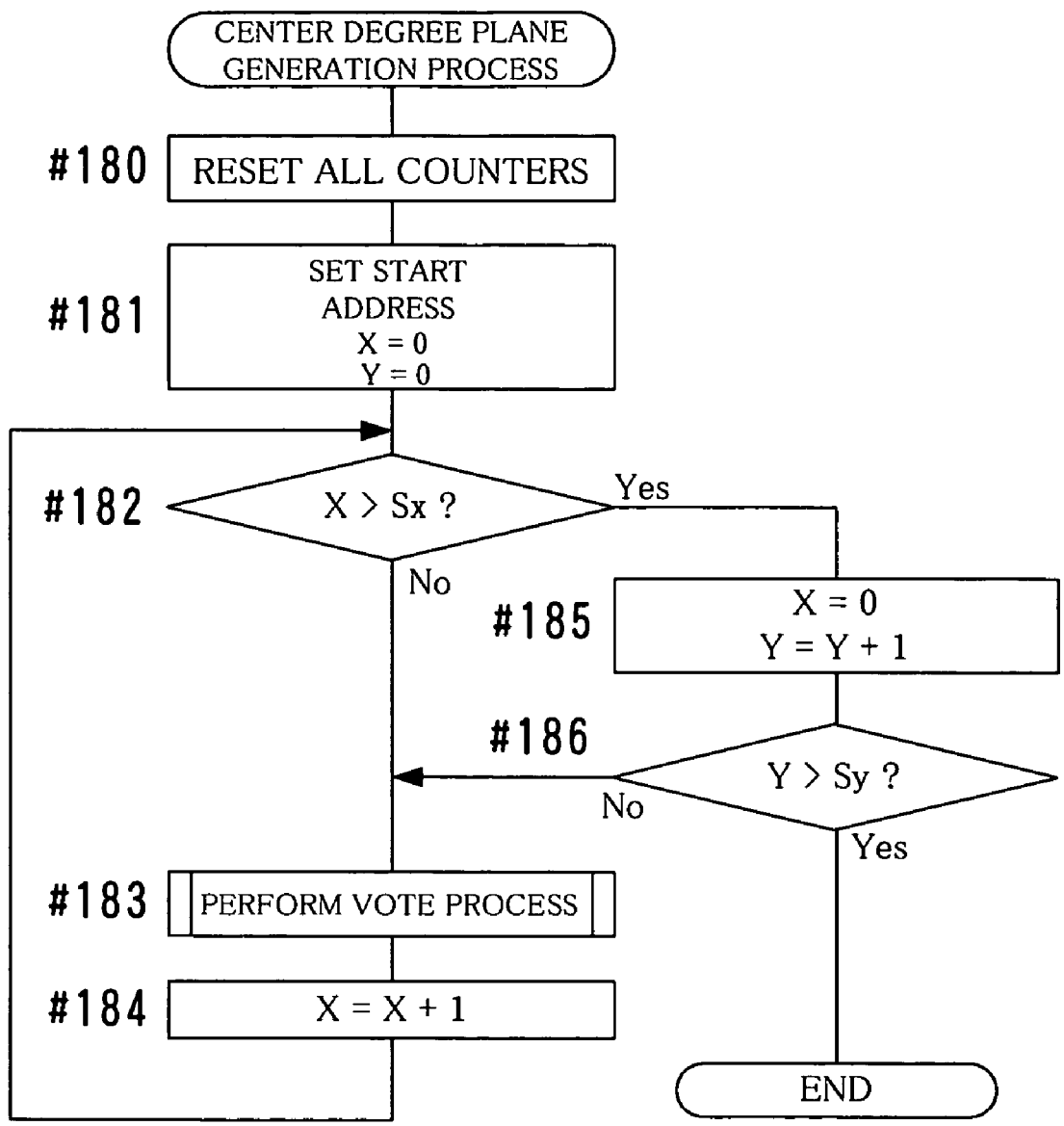
FIG. 25 is a flowchart explaining an example of a flow of a center degree plane calculation process.
Figure 26:
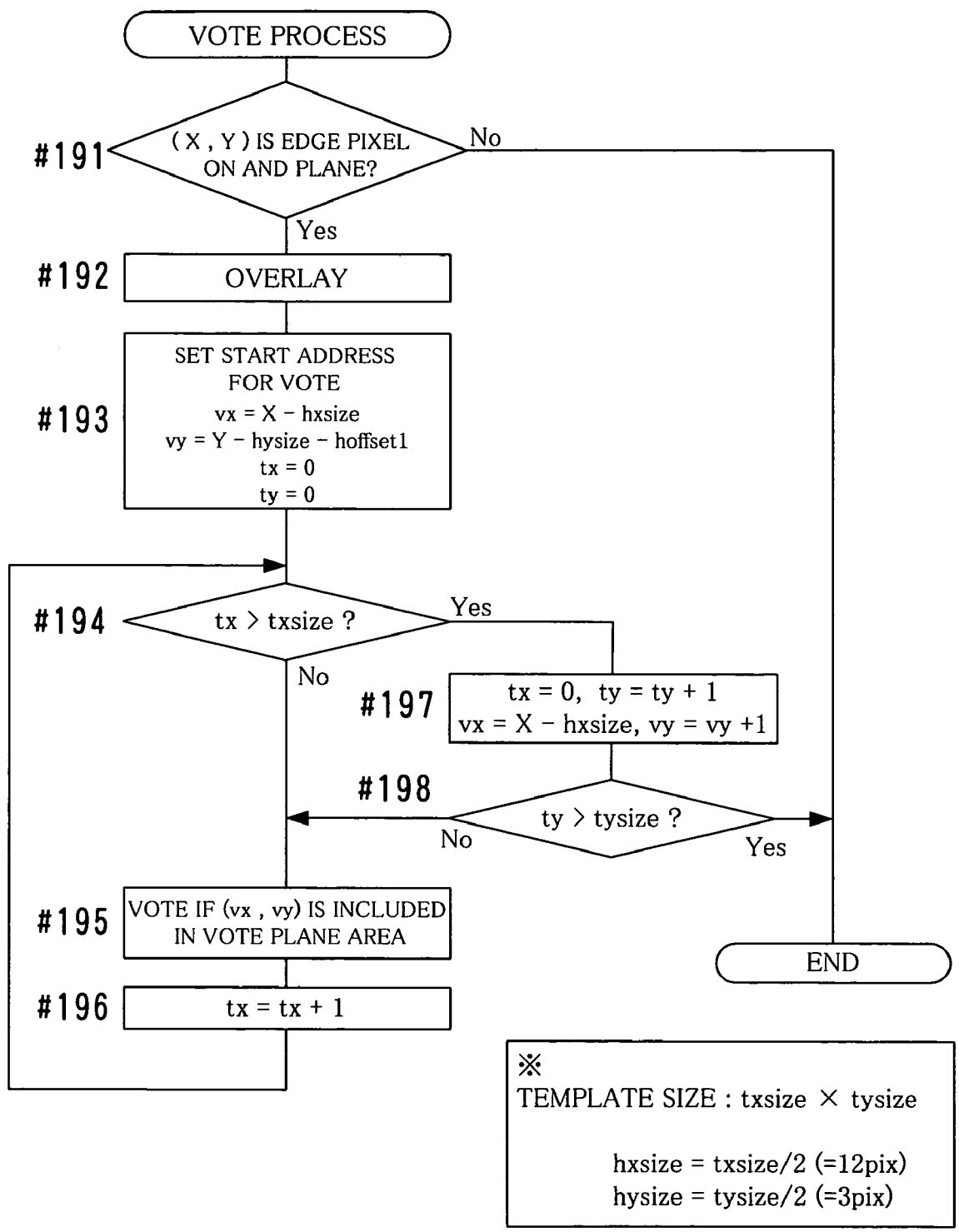
FIG. 26 is a flowchart explaining an example of a flow of a vote process.

FIGS. 17A-17D are diagrams showing an example of four sorts of a feature factor plane 8, FIG. 18 is a diagram showing a relationship between a flesh color chromaticity and values of U and V components of a pixel value in a YUV space, FIG. 19 is a flowchart explaining an example of a flow of a flesh color chromaticity plane generation process, FIG. 20 is a flowchart explaining an example of a flow of a hair color chromaticity plane generation process, FIG. 21 is a diagram explaining about an offset correction, FIG. 22 is a diagram showing a relationship between a hair color chromaticity and values of U and V components of a pixel value in a YUV space, FIGS. 23A and 23B are diagrams showing an example of the templates TP1 and TP2, FIGS. 24A-24C are diagrams showing an example of a method of generating templates TP1 and TP2, FIG. 25 is a flowchart explaining an example of a flow of a center degree plane calculation process, FIG. 26 is a flowchart explaining an example of a flow of a vote process, FIGS. 27A-27D are diagrams showing an example of a method of template matching using the template TP1.

As shown in FIG. 4C, the feature quantity operation portion 103 includes a flesh color chromaticity plane generation portion 301, a semiellipse center degree plane generation portion 302, a hair color chromaticity plane generation portion 303 and a shoulder center degree plane generation portion 304. The feature quantity operation portion 103 performs an operation process for generating four feature factor planes 8 (a flesh color chromaticity plane 8FC, a semiellipse center degree plane 8SE, a hair color chromaticity plane 8HC and a shoulder center degree plane 8SH). These feature factor planes 8 are expressed as gray scale images (brightness images) in which a value of each pixel is expressed by density as shown in FIG. 17. It is similar to the head center degree plane 84 (see FIG. 32) that will be explained later.

The flesh color chromaticity plane generation portion 301 generates the flesh color chromaticity plane 8FC by detecting the flesh color chromaticity of each pixel in the cut-out thumbnail image GS generated by the image reduction process portion 202 shown in FIG. 4B. The "flesh color chromaticity" means the likelihood to be flesh color. In other words, the flesh color chromaticity becomes large as approaching or being similar to flesh color. In this embodiment, it is set that the flesh color chromaticity becomes the maximum value when the values of the U component and the V component of the pixel value (YUV values, here) become FCu and FCv, respectively. For example, in order to set beige color as the flesh color, FCu and FCv are set to "107" and "157", respectively. The flesh color chromaticity is calculated by assigning a pixel value into the following equation (9).

$$FPfc(i, j) = 400 + Y(i, j) - \\ 7 \times abs\,|\,(U(i, j) - FCu) + (V(i, j) - FCv)\,| - \\ 6 \times (abs\,|\,U(i, j) - FCu\,| + abs\,|\,V(i, j) - FCv\,|) \quad (9)$$

Here, abs|A| is an absolute value of A.

Furthermore, a relationship between a value of flesh color chromaticity and values of the U component and the V component of a pixel shown in the equation (9) can be expressed in a gray scale image approximately as shown in FIG. 18.

The procedure of a process for detecting the flesh color chromaticity of each pixel in the cut-out thumbnail image GS is as shown in steps #161-#166 in FIG. 19. Namely, flesh color chromaticity of pixels in the cut-out thumbnail image GS are calculated sequentially (#163), so as to generate a flesh color chromaticity detection plane.

Supposing that a face (a head) of a pedestrian HMN is included in the image FG taken by the video camera 2 (see FIG. 5), an image area having high flesh color chromaticity in the flesh color chromaticity detection plane obtained by the process in the steps #161-#166 must be substantially identical to the area of the head of the pedestrian HMN. Therefore, it is considered that a head center of the pedestrian HMN to be searched exists in the pixel or the image area that includes a peak of the flesh color chromaticity in the flesh color chromaticity detection plane.

However, the entire face does not have a flesh color, but includes eyebrows, eyes, nostrils, lips and other parts that have colors except the flesh color. Furthermore, there is a case where a pedestrian HMN wears glasses, or an original image FG has noises. Therefore in this embodiment, following correction process is performed for improving accuracy of detecting a head center, for example.

Namely, in order to remove parts except the flesh color and noises, the flesh color chromaticity detection plane obtained in the step #161-#166 is processed by using a 3×3 luminance (brightness) maximum value filter so as to perform a dilation process (#167). Then, in order to improve sharpness, the flesh color chromaticity detection plane after the dilation process is processed by using a 3×3 luminance (brightness) minimum value filter so as to perform an erosion process. In addition, an average process is performed between the flesh color chromaticity detection plane before the erosion process and the flesh color chromaticity detection plane after the erosion process (#168). The process in the step #168 is repeated "(HW/2)+1" times. Here, "HW" is the number of pixels indicating a width of a head that is a target of detection and is considered to be in the cut-out thumbnail image GS. For example, if the number of pixels indicating the width of a head is considered to be "7", the process in the step #168 is repeated four or five times.

In this way, the flesh color chromaticity of the cut-out thumbnail image GS is detected (#161-#166), and the correction process (#167, #168) is performed so as to improve detection accuracy. As a result, the flesh color chromaticity plane 8FC is generated as shown in FIG. 17A.

With reference to FIG. 4C again, the hair color chromaticity plane generation portion 303 generates the hair color chromaticity plane 8HC as shown in FIG. 17C by detecting hair color chromaticity of each pixel of the cut-out thumbnail image GS generated by the image reduction process portion 202 shown in FIG. 4B. The "hair color chromaticity" means the likelihood to be hair color. In other words, the hair color chromaticity becomes large as approaching or being similar to hair color. In this embodiment, it is set that the hair color chromaticity becomes the maximum value when the values of the U component and the V component of the pixel value become HCu and HCv, respectively. For example, in order to set black color as the hair color, FCu and FCv are set to "112" and "142", respectively.

The procedure for generating the hair color chromaticity plane 8HC is basically the same as the procedure for generating the flesh color chromaticity plane 8FC. Namely, as shown in FIG. 20, the hair color chromaticity is calculated for each pixel of the cut-out thumbnail image GS (#171-#176), and the process for improving accuracy of detecting the head center is performed (#177 and #178). Here, as a function of detecting the hair color chromaticity, the function of the following equation (10) is used instead of the function of the equation (9).

$$FPhc(i, j) = 400 + (Y(i, j - \mathit{offset})/2) - \\ 9 \times abs\,|\,(U(i, j - \mathit{offset}) - HCu) + \\ (V(i, j - \mathit{offset}) - HCv)\,| - \\ 4 \times (abs\,|\,U(i, j - \mathit{offset}) - HCu\,| + \\ abs\,|\,V(i, j - \mathit{offset}) - HCv\,|) \quad (10)$$

As shown in FIG. 21, the area where high hair color chromaticity is detected is the area RYk of the upper portion of a head having hairs. However, as explained above, to detect a head center (the point Ptc) is the purpose in this embodiment. Accordingly, an adjustment of shift (an offset correction) is performed in the Y axis direction (vertical direction) in the equation (10), so that the center (the point Ptk) of the area in which high hair color chromaticity is predicted to be detected becomes identical to the head center (the point Ptc) as much as possible. The "offset" in the equation (10) is a offset value and is set like offset=HS/2, for example. The "HS" is the number of pixels indicating a length between the top of head and the chin of a head that is a target of detection and is considered to be in the cut-out thumbnail image GS. For example, if the number of pixels indicating the length is considered to be "9", the offset becomes 4.5.

Furthermore, a relationship between a value of hair color chromaticity and values of the U component and the V component of a pixel shown in the equation (10) can be expressed in a gray scale image as shown in FIG. 22.

With reference to FIG. 4C again, the semiellipse center degree plane generation portion 302 detects semiellipse center degree of each pixel of the logical product plane AN (the edge image) generated by the logical product image generation portion 205 shown in FIG. 4B, so as to generate the semiellipse center degree plane 8SE as shown in FIG. 17B. The "semiellipse center degree" means likelihood of being a center, i.e., a degree how the pixel of the logical product plane AN is close to the center position of the template (the reference point CT1) when template matching process is performed on the logical product plane AN by using the template TP1 having a semiellipse shape as shown in FIG. 23A. As the method of template matching, for example, a method in accordance with Hough transformation is used, which will be explained later.

The template TP1 and the template TP2 that is used by the shoulder center degree plane generation portion 304 that will be explained later are generated as below, for example.

First, a person who is a model stands at a reference position L1 in the passage (see FIG. 2), so that a image of the person is taken by the video camera 2. The person to be a model has preferably a standard body shape. As shown in FIG. 24A, a contour portion of the model in the image obtained by the shooting is noted.

As shown in FIG. 24B, one open curve indicating the upper half of a head and two open curves indicating shoulders are extracted as edges EG1 and EG2 respectively from the contour of the model. On this occasion, predetermined positions that are located away from the edges EG1 and EG2 are defined as reference points CT1 and CT2, respectively. The reference points CT1 and CT2 indicate reference positions (center positions) of the templates TP1 and TP2, respectively. Furthermore, it is possible to set the reference points CT1 and CT2 to predetermined positions on the edges EG1 and EG2, respectively. The reference points CT1 and CT2 are also extracted together with the edges EG1 and EG2.

In this way, template images are obtained as shown in FIGS. 24B and 24C. Then, the edges EG1 and EG2 are rotated a half turn (by 180 degrees) around the reference points CT1 and CT2, respectively. In this way, templates TP1 and TP2 are generated. The templates TP1 and TP2 are memorized (stored) in the template memory portion 1M3 shown in FIG. 4A.

Alternatively, if is considered that a size of a head in the logical product plane AN is not so large (e.g., it is considered to be 10 pixels each horizontally and vertically), it is possible to make a semiellipse of the considered size by using CG software or others, and use it as the template TP1. It is the same for the template TP2.

References α1, α2 in FIG. 24A are offset values that are used for adjusting shifts upon the template matching (for the offset correction). As explained above, to detect a head center is the purpose in this embodiment. Therefore, it is desired that the peak position of the semiellipse center degree match the position of head center as much as possible.

The procedure for generating the semiellipse center degree plane 8SE is as shown in FIG. 25. Namely, counters are prepared first so that one counter corresponds to each pixel in the logical product plane AN. Each counter is preset to "0" (#180), and the coordinates of the start address are set to (0, 0) (#181). The vote process is performed on the pixel at (0, 0) in the logical product plane AN as the noted pixel (#183). The vote process is performed in accordance with the procedure as shown in FIG. 26.

First, it is decided whether or not the noted pixel exists on the edge (the contour line) in the logical product plane AN (#191). If it does not exist on the edge (No in #191), the vote process for the noted pixel is finished so as to proceed to the step #184 in FIG. 25.

Figure 27A:
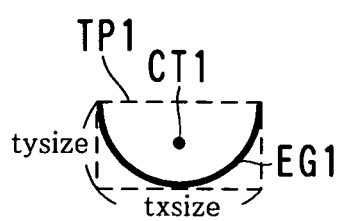
FIGS. 27A-27D are diagrams showing an example of a method of template matching using a template.
Figure 27B:
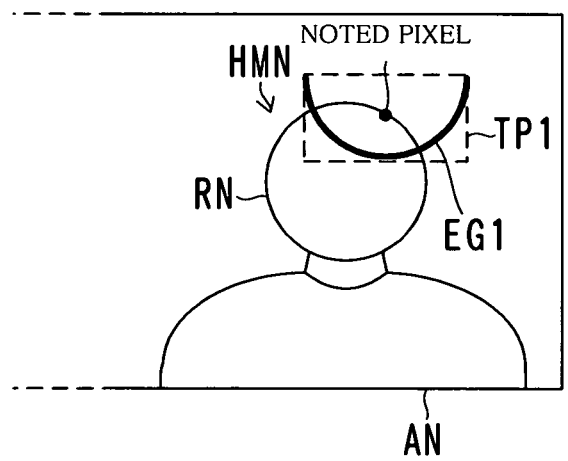

As shown in FIG. 27B, if the noted pixel exists on the edge RN in the logical product plane AN (Yes in #191), the template TP1 is overlaid on the logical product plane AN so that the noted pixel matches the reference point CT1 of the template TP1 (#192).

The area of tx size by ty size in the logical product plane AN that is overlaid with the template TP1 (the area enclosed by a broken line in FIG. 27B) is noted for performing the process in the step #193-#198. Namely, pixels that are overlapped with the edge EG1 in the area enclosed by a broken line are found. Then, as shown in FIG. 27D, one vote is added to the counter of the pixel that is shifted (corrected offset) downward from the found pixel by the offset value α1 (see FIG. 24A).

Figure 27C:
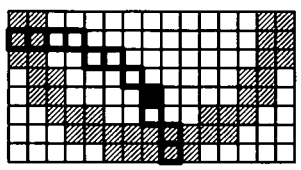
Figure 27D:
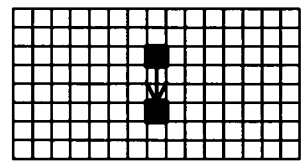

Furthermore, in FIG. 27C, a square of a thick frame indicates a pixel on the edge RN of the logical product plane AN, a square filled in black indicates the noted pixel, and a square with hatching indicates a pixel overlapped with the edge EG1 of the template TP1.

With reference to FIG. 25 again, the vote process is performed on the other pixels in the logical product plane AN in the same way with defining each of them as the noted pixel (#182-#186). After performing the above-mentioned vote process, a distribution of vote numbers that are counted in the counters of the pixels is obtained as the semiellipse center degree plane 8SE as shown in FIG. 17B.

With reference to FIG. 4C again, the shoulder center degree plane generation portion 304 detects the shoulder center degree of each pixel in the logical product plane AN (the edge image) generated by the logical product image generation portion 205 shown in FIG. 4B, so as to generate the shoulder center degree plane 8SH as shown in FIG. 17D. The "shoulder center degree" means a degree how the pixel in the logical product plane AN is close to the center position of the template (the reference point CT2), i.e., a likelihood of being a center when performing the template matching on the logical product plane AN by using the template TP2 that has a shape of shoulders shown in FIG. 23B.

The procedure for generating the shoulder center degree plane 8SH is similar to the procedure for generating the semiellipse center degree plane 8SE shown in FIGS. 25 and 26. Here, the template TP2 (see FIG. 23B) is used for the template matching, and the offset value α2 (see FIG. 24A) is used for the offset correction.

The feature factor plane memory portion 1M1 shown in FIG. 4A memorizes the feature factor plane 8 (the flesh color chromaticity plane 8FC, the semiellipse center degree plane 8SE, the hair color chromaticity plane 8HC and the shoulder center degree plane 8SH) generated by the plane generation portions 301-304 of the feature quantity operation portion 103 in connection with a shooting time of the image FG to be a base.

[Calculation of Head Center Degree and Detection of Head Center]

Figure 28:
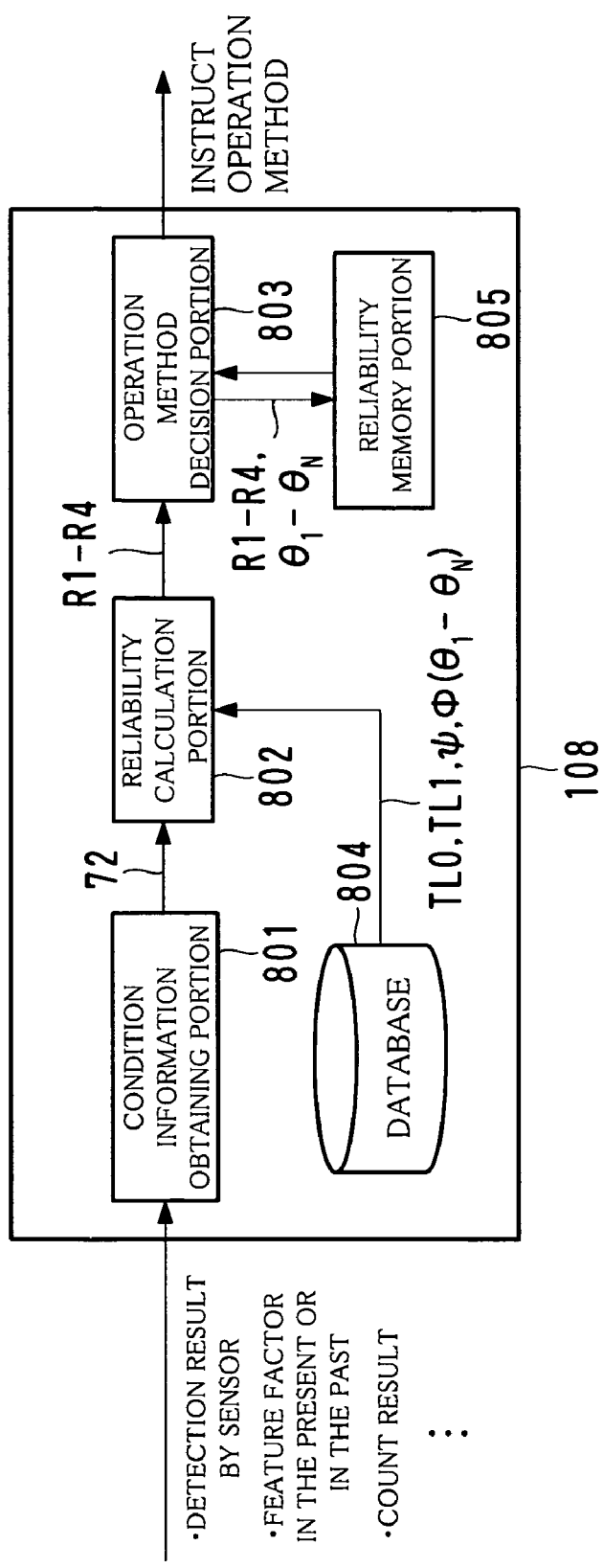
FIG. 28 is a diagram showing an example of a structure of a learning portion.
Figure 30:
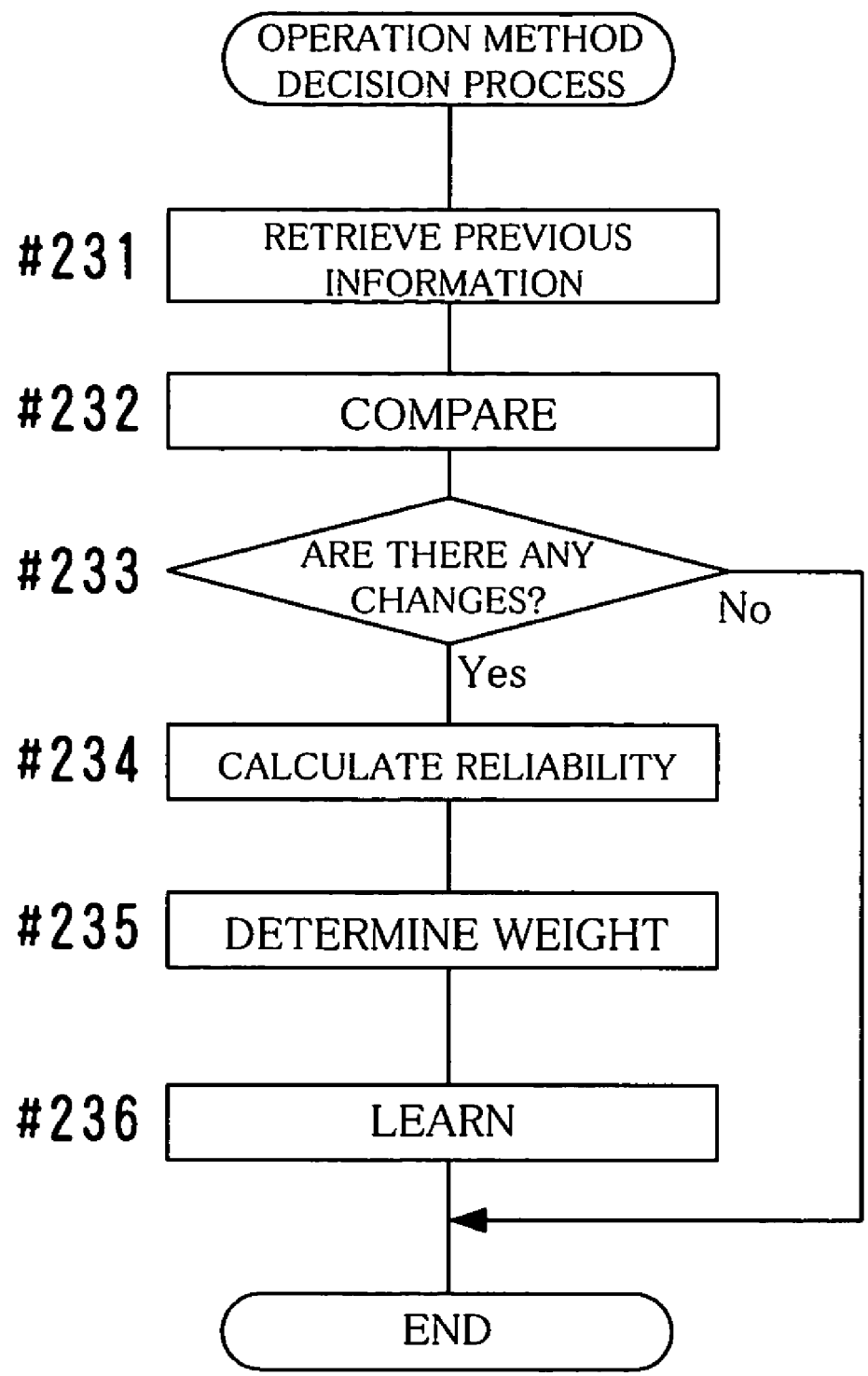
FIG. 30 is a flowchart explaining an example of a flow of an operation method decision process.
Figure 32:
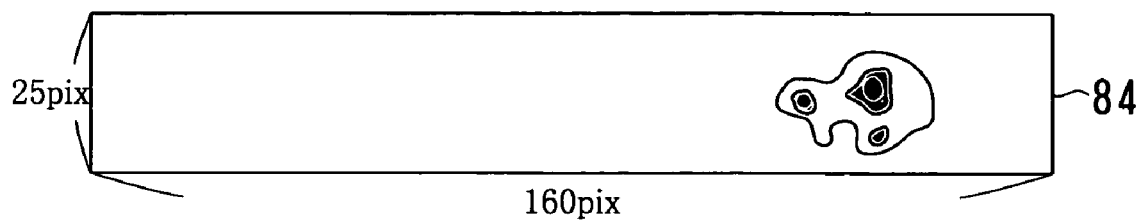
FIG. 32 is a diagram showing an example of a head center degree plane.
Figure 33:
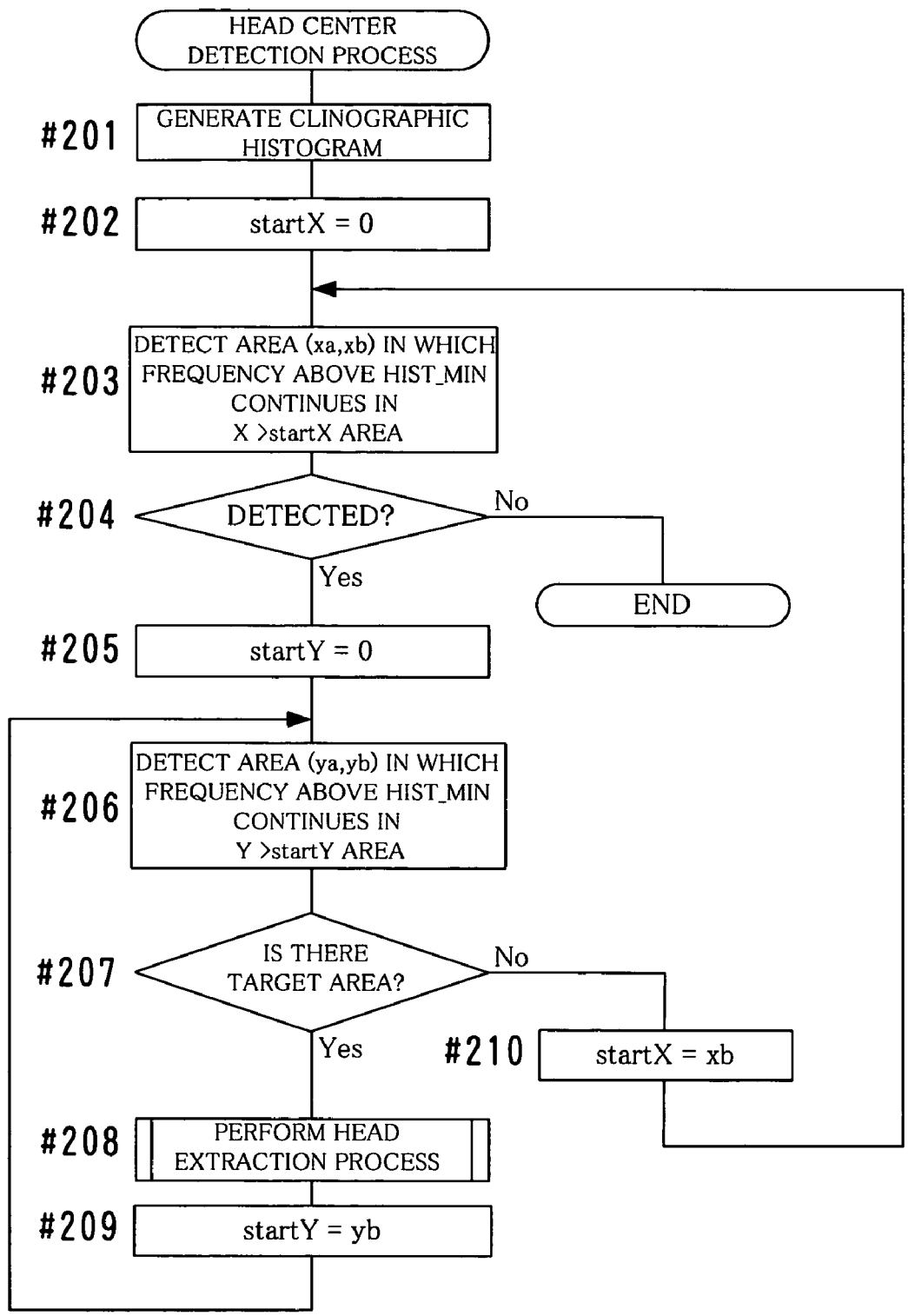
FIG. 33 is a flowchart explaining an example of a flow of a head center detection process.
Figure 34:
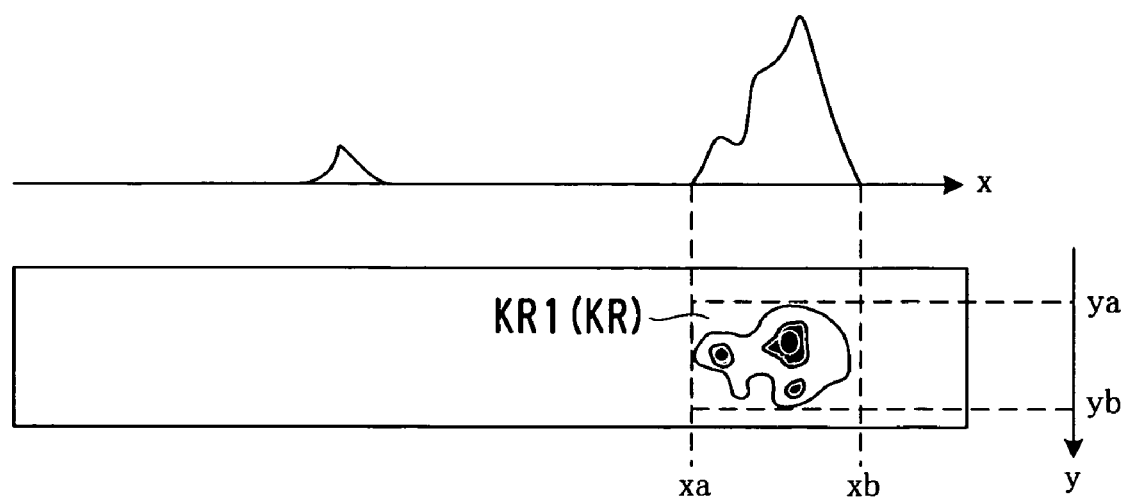
FIG. 34 is a diagram showing an example of an extraction of a rectangular area.
Figure 35:
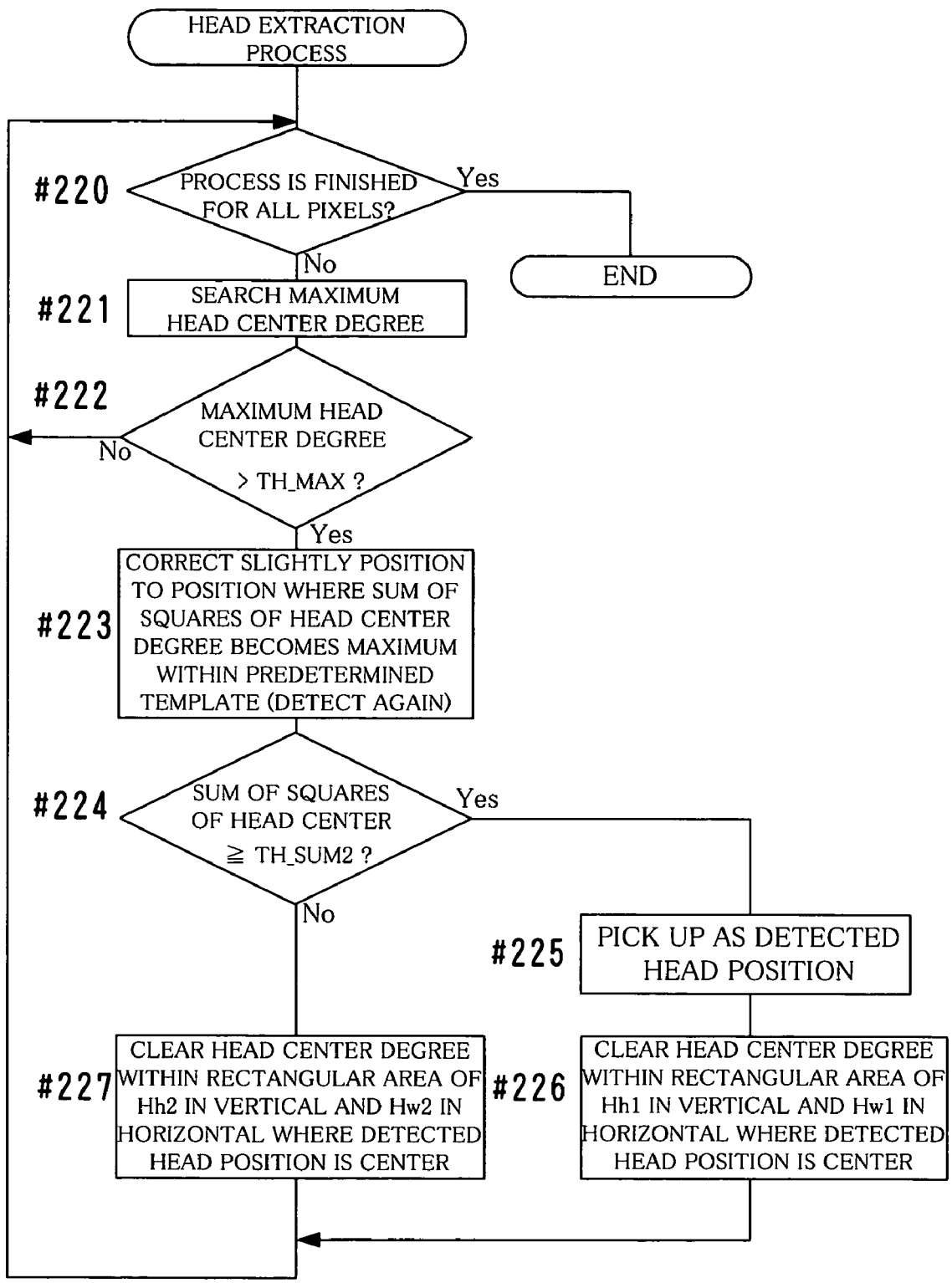
FIG. 35 is a flowchart explaining an example of a flow of a head extraction process.
Figure 37A:
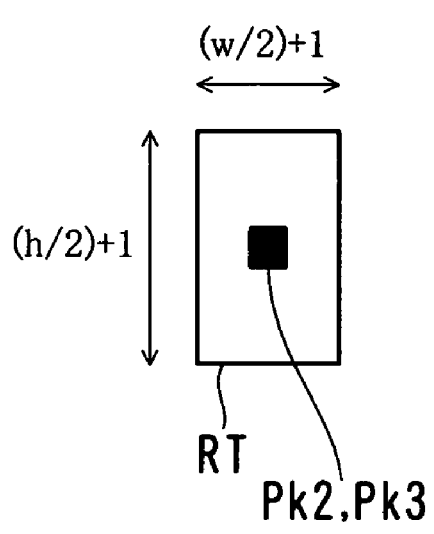
FIGS. 37A and 37B are diagrams showing an example of a seek area and an area for calculating a sum of squares.
Figure 37B:
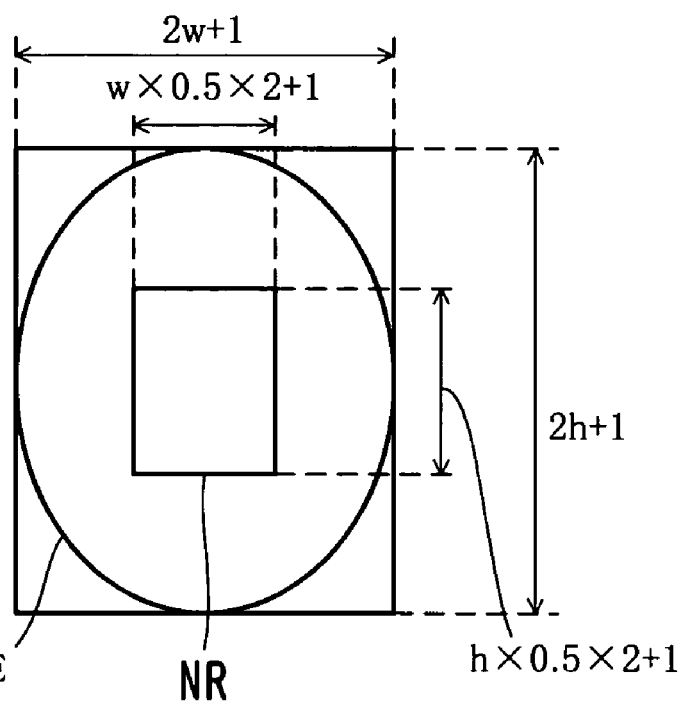
Figure 38:
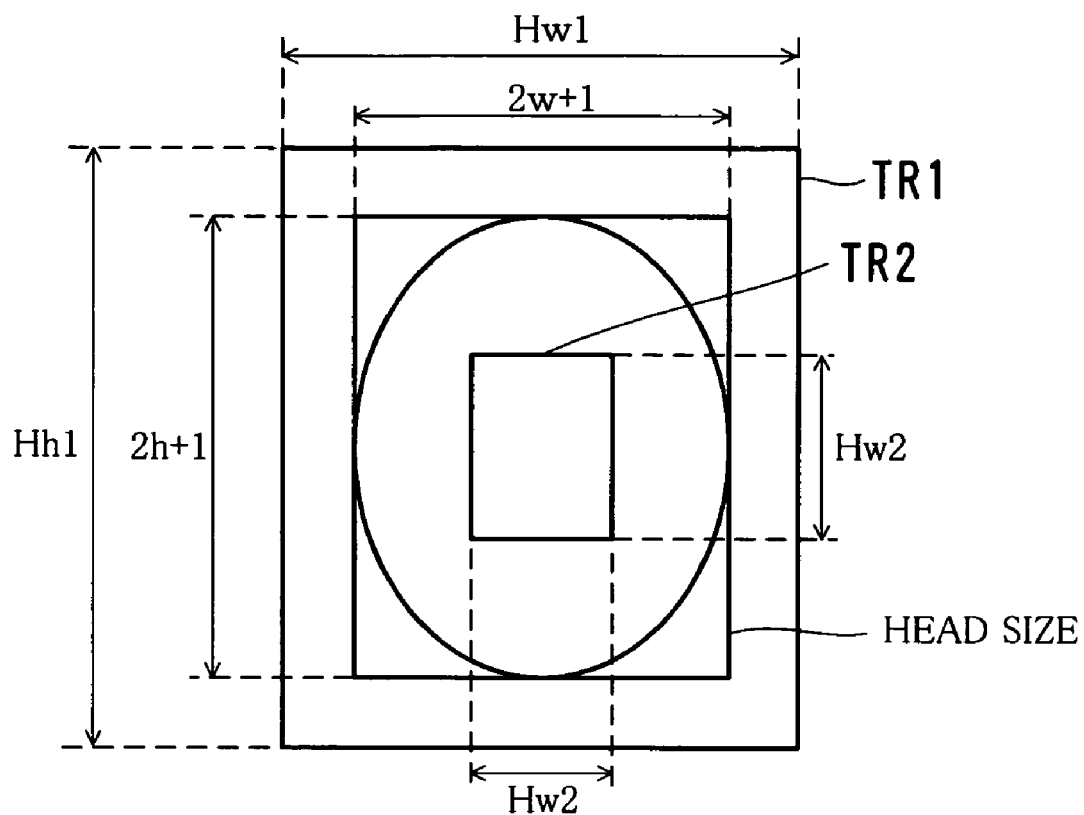
FIG. 38 is a diagram showing an example of shapes and sizes of areas to be cut out of the rectangular area or to be cleared.

FIG. 28 is a diagram showing an example of a structure of a learning portion 108, FIGS. 29A and 29B are charts showing an example of a relationship among changes of various shooting conditions, phenomena and influences accompanying the changes, FIG. 30 is a flowchart explaining an example of a flow of a operation method decision process, FIG. 31 is a chart showing an example of a reliability conversion table TL0, FIG. 32 is a diagram showing an example of a head center degree plane 84, FIG. 33 is a flowchart explaining an example of a flow of a head center detection process, FIG. 34 is a diagram showing an example of an extraction of a rectangular area KR, FIG. 35 is a flowchart explaining an example of a flow of a head extraction process, FIGS. 36A-36D are diagrams showing an example of a method of generating a head detection result plane TK, FIGS. 37A and 37B are diagrams showing an example of a seek area RT and an area for calculating a sum of squares NR, and FIG. 38 is a diagram showing an example of shapes and sizes of areas TR1 and TR2 to be cut out of the rectangular area KR1 or to be cleared.

The head center degree plane generation portion 104 performs a process for generating the head center degree plane 84 (see FIG. 32). The "head center degree" means a likelihood of being a head center, i.e., a degree of being close to the head center. The head center degree plane 84 is generated in accordance with the operation result by the learning portion 108 and four sorts of feature factor planes 8, i.e., the flesh color chromaticity plane 8FC, the semiellipse center degree plane 8SE, the hair color chromaticity plane 8HC, and the shoulder center degree plane 8SH shown in FIG. 17. A method for generation will be explained later.

The learning portion 108 includes a condition information obtaining portion 801, a reliability calculation portion 802, an operation method decision portion 803, a database 804, and a reliability memory portion 805 as shown in FIG. 28, so as to perform a process of determining an optimum operation method for detecting a head center and for learning.

The condition information obtaining portion 801 obtains information that indicates various conditions about taking an image such as an environment or a state of the passage to be monitored, or setting or a state of the video camera 2. Hereinafter, this information is referred to as "condition information 72". The condition information 72 is obtained as follows, for example.

The condition information 72 that indicates a state about brightness in the passage is obtained by extracting a Y component value of a mean value (a mean pixel value) of YUV space values of the image FG that is received from the video camera 2. Alternatively, it is possible to use an illuminance sensor as the sensor 3 (see FIG. 1) and to obtain the detection result information 80 that is received from the sensor 3 as the condition information 72.

A shadow of a pedestrian or a white balance changes in accordance with a time zone of day, such as morning, noon, evening or night. Therefore, it is possible to register information indicating generation situation of a shadow of a pedestrian or a white balance in each time zone in the database 804 in advance, to obtain time information indicating the present time from a timer embedded in the human body detection apparatus 1 or an external device, so as to obtain information of the generation situation corresponding to the time information as the condition information 72 about a shadow of a pedestrian or a white balance. Alternatively, it is possible to use a white balance sensor as the sensor 3, so as to obtain the detection result information 80 that is received from the sensor 3 as the condition information 72 about the white balance.

A tendency of features of pedestrians (customers) passing along the passage also changes depending on time zones including morning, noon, evening and night. Therefore, it is possible to register customer class information in the database 804 in advance, which indicates an intermediate value of the number of pedestrians, age bracket, height, passing speed, the number of groups like a couple or a family in each time zone, so as to obtain the customer class information corresponding to the time information obtained from the timer as the condition information 72 about the tendency of features of pedestrians. Alternatively, it is possible to install a weight sensor as the sensor 3 on a floor, so as to obtain the condition information 72 in accordance with the detection result information 80 that is received from the sensor 3. For example, the number of pedestrians can be known from the number of detection result information 80 received per unit time. An age bracket and a height of a pedestrian can be assumed from a weight detected by the sensor 3 (i.e., a weight of a pedestrian). Moreover, it is possible to feedback the process result of a count process portion 503 that will be explained later, so as to obtain the condition information 72 about the number of pedestrians in accordance with the process result. The condition information 72 about a passing speed may be obtained by calculating an optical flow of a plurality of images FG that are received from the video camera 2 and are arranged sequentially.

The condition information 72 about setting of the video camera 2 such as a camera speed (a frame rate), zooming, panning and tilting is obtained from the video camera 2. The condition information 72 about a place where the video camera 2 is installed is obtained when an operator enters it by operating the input device 1g (see FIG. 3). Furthermore, it is possible that the operator enters the condition information 72 about the above-mentioned lighting, pedestrians, setting of the video camera 2, too.

Furthermore, it is not necessary to obtain the condition information 72 every time when one image FG is taken (namely, for each frame), but it is sufficient to obtain the condition information 72 at a predetermined interval of time (frames).

If the condition information 72 obtained as explained above about various sorts of shooting conditions (an environment, a state or setting) does not match (is shifted or changed from) the reference condition to be optimal for shooting, a phenomenon as shown in FIGS. 29A and 29B appears, which affects an appearance of the feature factor (flesh color chromaticity, hair color chromaticity, head center degree or shoulder center degree) in the image FG. Namely, accuracy of the feature factor plane 8 shown in FIG. 17 is influenced.

For example, if the obtained condition information 72 indicates that the illuminance in the passage has changed from the reference illuminance, colors of a skin, hairs or other parts of a pedestrian in the image FG and a color of the background may become more incorrect as the ratio of the change is larger. As a result, correctness (accuracy) of the flesh color chromaticity and the hair color chromaticity that appear in the flesh color chromaticity plane 8FC and the hair color chromaticity plane 8HC may be lowered.

In addition, if the obtained condition information 72 indicates that the number of pedestrians is larger than the usual value (the reference value) of the number of pedestrians, probability of overlapping of pedestrians increases so that the number of pedestrians whose shoulders cannot be observed in the image FG becomes larger as the number of pedestrians increases. As a result, correctness of the shoulder center degree in the shoulder center degree plane 8SH is lowered.

Therefore, the reliability calculation portion 802 performs the process of calculating reliability R of flesh color chromaticity, hair color chromaticity, head center degree and shoulder center degree (hereinafter may be referred to a "feature factor" as a general name) in the current shooting condition of the video camera 2 in accordance with the procedure as shown FIG. 30. Furthermore, in this embodiment, the condition information 72 (721, 722, . . . , and 72N) about N sorts of shooting conditions is obtained. Furthermore, parameters for storing values indicating contents of the condition information 721, 722, . . . , and 72N are referred to as environment parameters θ1, θ2, . . . , and θN.

It is supposed that new condition information 72 is obtained by the condition information obtaining portion 801. Then, the reliability calculation portion 802 retrieves condition information 72 of the same sort and obtained in the past (e.g., just before) from the database 804 (#231) and compares contents of them (#232).

As a result of the comparison, if there is a difference larger than predetermined quantity or predetermined ratio between them, it is considered there was a change in the shooting condition of the video camera 2 (Yes in #233). Then, the reliability R of each feature factor is calculated by using the conversion function ψ shown in the equation (11) or others (#234).

$$\psi : R^N \to R^{N \times 4} \quad (11)$$

$$\psi \begin{pmatrix} \theta_1 \\ \theta_2 \\ \vdots \\ \theta_N \end{pmatrix} = \begin{pmatrix} r_1(\theta_1), & r_2(\theta_1), & r_3(\theta_1), & r_4(\theta_1) \\ r_1(\theta_2), & r_2(\theta_2), & r_3(\theta_2), & r_4(\theta_2) \\ \vdots & \vdots & \vdots & \vdots \\ r_1(\theta_N), & r_2(\theta_N), & r_3(\theta_N), & r_4(\theta_N) \end{pmatrix}$$

Here, the conversion function ψ is a function that expresses an influence of each environment parameter θ (condition information 72) to each feature factor, which is prepared for each environment parameter θ. The functions $r_1(\theta_k)$, $r_2(\theta_k)$, $r_3(\theta_k)$ and $r_4(\theta_k)$ are individual reliability functions for calculating the flesh color chromaticity, the hair color chromaticity, the semiellipse center degree, and the shoulder center degree for the environment parameter θk (here, $1 \leq k \leq N$), respectively. In addition, $r(\theta) \in [0, 1]$.

More specifically, the value of the condition information 72k that is newly obtained is assigned into each individual reliability functions $r_1(\theta_k)$-$r_4(\theta_k)$ of right-hand side of the equation (11) first. Furthermore, among the N sorts of condition information 72, if there is condition information 72 that is not obtained at the same timing as the condition information 72k, the value of the condition information 72 that is obtained recently and has the same sort as the condition information 72 that is not obtained is assigned.

The product of the r(θ) for each of the calculated feature factors is calculated in accordance with the following equation (12).

$$R_i = \prod_{j=1}^{N} r_i(\theta_j) \quad (i = 1, 2, 3, 4) \quad (12)$$

Here, the reliability values R1, R2, R3 and R4 are respectively about flesh color chromaticity, hair color chromaticity, semiellipse center degree and shoulder center degree. Hereinafter, they may be referred to as "flesh color reliability R1", "hair color reliability R2", "semiellipse center reliability R3", and "shoulder center reliability R4".

In this way, reliability values R1-R4 of feature factors are calculated. As shown in the equation (12), the reliability values R1-R4 are product and integration of reliability (individual reliability) of N sorts of shooting conditions. Therefore, the reliability R can be called "integrated reliability". Furthermore, the integrated conversion function in which the equation (11) and the equation (12) are integrated can be expressed as the following equation (13).

$$\Phi \begin{pmatrix} \theta_1 \\ \theta_2 \\ \vdots \\ \theta_N \end{pmatrix} = \begin{pmatrix} R_1 \\ R_2 \\ R_3 \\ R_4 \end{pmatrix} \quad (13)$$

Furthermore, each individual reliability function r(θ) shown in the equation (12) is prepared offline in advance by analyzing and quantifying empirical rules and experimental results. For example, if a value of the environment parameter θ about illuminance (e.g., θ1) is small, the video camera 2 cannot detect a color properly. Therefore, individual reliability functions r1(θ1) and r2(θ1) are set so that the individual reliability values of the flesh color chromaticity and the hair color chromaticity become small. Furthermore, if a value of the environment parameter θ about the number of pedestrians (e.g., θ2) is small, probability of overlapping between image areas of pedestrians decrease. Therefore, the individual reliability function r4(θ2) is set so that the individual reliability of the shoulder center degree increases. On the contrary, if a value of the environment parameter θ about the number of pedestrians (e.g., θ2) is large, the individual reliability function r4(θ2) is set so that the individual reliability of the shoulder center degree decreases. If the reliability value of the semiellipse center degree is constant despite a value of the environment parameter θ (e.g., θ3) about a certain shooting condition, it is set that the individual reliability function r3(θ3)=β (β is a constant).

With reference to the flowchart again, weights are assigned to the flesh color reliability R1, the hair color reliability R2, the semiellipse center reliability R3 and the shoulder center reliability R4 and weights w1-w4 are determined so as to perform an operation of detecting a head that will be performed later (#235 in FIG. 30). The weights w1-w4 are obtained by assigning the values of the reliability values R1-R4 that are calculated in the above-mentioned equation (12) into the following equation (14) for normalization, for example.

$$w_i = \frac{R_i}{\sum_{k=1}^{4} R_k} \quad (i = 1, 2, 3, 4) \quad (14)$$

The reliability values R1-R4 and the weights w1-w4 calculated in the steps #234 and #235 are stored in the reliability memory portion 805. Thus, the human body detection apparatus 1 learns reliability of each feature factor corresponding to the present shooting condition of the video camera 2 (#236).

On the other hand, as a result of the comparison between the new condition information 72 obtained by the condition information obtaining portion 801 and the condition information 72 obtained in the past (#232), if the difference between contents of them is smaller than a predetermined value, it is decided that there is not change in the shooting condition of the video camera 2 (No in #233), the calculation of the reliability and others are not performed. Therefore, reliability that was learned before is used for the head detection process that will be performed later.

Furthermore, in order to obtain the reliability values R1-R4 in the step #234, the reliability conversion table TL0 as shown in FIG. 31 may be used instead of the conversion function ψ. The reliability conversion table TL0 is generated in accordance with experimental results or empirical rules. For example, while changing the shooting condition (values of the environment parameters θ1-θN) gradually, each feature factor plane 8 (see FIG. 17) is generated. The result is evaluated by the experimenter so that the reliability values R1-R4 corresponding to the combinations of the values of the environment parameters θ1-θN are determined. Thus, the reliability conversion table TL0 is completed. The reliability conversion table TL0 is registered in the database 804.

With reference to FIG. 28 again, the operation method decision portion 803 performs a process of determining an operation method for generating the head center degree plane 84. More specifically, it is decided that the operation is performed by using a predetermined function that will be explained in accordance with the weights w1-w4 of the reliability values R1-R4 corresponding to the present shooting condition (such as a shooting environment and setting of the video camera 2) of the video camera 2, which are learned by the process of the reliability calculation portion 802. The decided contents are transmitted to the head center degree plane generation portion 104.

With reference to FIG. 4A again, the head center degree plane generation portion 104 uses the operation method decided by the operation method decision portion 803 of the learning portion 108 so as to perform the operation for generating the head center degree plane 84 as shown in FIG. 32. Namely, the head center degree plane generation portion 104 is controlled by the learning portion 108.

For example, it is supposed that the operation method decision portion 803 instructs so as to operate by using the function shown in the following equation (15) and the weights w1-w4. Then, the head center degree plane generation portion 104 assigns weights w1-w4 and the feature factor of each feature factor plane 8 generated by the feature quantity operation portion 103 into the equation (15), so as to calculate the head center degree TC(i, j) of each pixel. Thus, the head center degree plane 84 is generated.

$$TC(i, j) = \sum_{k=1}^{4} w_k \cdot I_k(i, j) \quad (15)$$

Here, I1(i, j)=FC(i, j), I2(i, j)=HC(i, j), I3(i, j)=SE(i, j), and I4(i, j)=SH(i, j). FC(i, j), HC(i, j), SE(i, j) and SH(i, j) denote pixel values (feature factors) of pixels at coordinates (i, j) in the flesh color chromaticity plane 8FC, the hair color chromaticity plane 8HC, the semiellipse center degree plane 8SE, and the shoulder center degree plane 8SH, respectively.

As shown in FIG. 4D, the detection process portion 105 includes a head center degree peak detection portion 501, a detection result plane generation portion 502, and a count process portion 503. The detection process portion 105 performs a process of detecting a head center of a pedestrian HMN in the image FG (see FIG. 5) in accordance with the head center degree plane 84 generated by the head center degree plane generation portion 104.

The head center degree peak detection portion 501 detects one or more positions where head centers of pedestrian HMN are assumed to exist on the head center degree plane 84 of the image FG that is a detection target. The detection result plane generation portion 502 finally decides the position of the head center of the pedestrian HMN in accordance with the positions detected by the head center degree peak detection portion 501, so that the head detection result plane TK indicating the result is generated. These processes are performed in accordance with the procedure as shown in FIG. 33.

First, a clinographic histogram as shown in FIG. 34 is calculated in accordance with a value of the concentration (head center degree) of each pixel on the head center degree plane 84 (#201 in FIG. 33). Noting the clinographic histogram in the horizontal direction, a value of each pixel is checked from the coordinates (0, 0) in the horizontal direction so as to detect an area in which a frequency above the threshold level HIST_MIN (e.g., "10") continues is detected (#202 and #203). If an area is not detected (No in #204), this detection process is finished as it is considered that a pedestrian does not exist in the image FG that is a target of detection.

If an area is detected (Yes in #204), the clinographic histogram of the area in the vertical direction that belongs to the detected area in the horizontal direction is noted, so as to detect an area in which a frequency above the threshold level HIST_MIN continues is detected (#206).

If the area is not found (No in #207), it is checked whether or not there is another area in which a frequency above the threshold level HIST_MIN continues as shown in step #203 again.

If another area is found (Yes in #207), a head extraction process that will be explained below is performed on the rectangular area KR (e.g., the rectangular area KR1 defined by xa≦x≦xb, ya≦y≦yb in FIG. 34) of the area that was found in the steps #203 and #206 (#208).

As shown in FIG. 35, a peak of the pixel value (head center degree) is detected from the rectangular area KR (e.g., the rectangular area KR1) (#221). Then, as shown in FIG. 36A, three pixels of the peak (hereinafter referred to as "peak pixel Pk") are detected.

It is decided whether or not the detected peak pixel Pk satisfies the following two conditions, so that a head center is detected.

(A) The pixel value (a head center degree) of the peak pixel Pk exceeds the threshold level TH_MAX.

(B) The sum of squares of the area for calculating a sum of squares having a center that is the peak pixel Pk after fine adjustment (the maximum sum of squares) equal to or more than the threshold level TH_SUM2.

It is decided that there is possibility of existence of the head center at the peak pixel Pk that satisfies the condition (A) or the vicinity thereof, while there is no possibility of existence of the head center at the peak pixel Pk that does not satisfy the condition (A) and vicinity thereof (#222). As a result of this decision, it is considered that the peak pixel Pk1 does not satisfy the above-mentioned condition (A) (No in #222), while the peak pixels Pk2 and Pk3 satisfy the above-mentioned condition (A) (Yes in #222). In this case, only the peak pixels Pk2 and Pk3 are noted as follows.

The fine adjustment (fine correction) of the positions of the present peak pixels Pk2 and Pk3 is performed as follows, so that the peak pixels Pk2 and Pk3 match the head center to be detected more precisely (#223).

First, as shown in FIG. 37A, an area of "(w/2)+1" of pixels in the horizontal direction and "(h/2)+1" pixels in the vertical direction having the center that is a position of the present peak pixel Pk2 (hereinafter referred to as a "seek area RT") is noted. Concerning each pixel within the seek area RT, the pixel is made the center of the area for calculating a sum of squares NR shown in FIG. 37B, and the sum of squares of pixel values within the area for calculating a sum of squares NR is calculated. Then, the pixel of the center of the area for calculating a sum of squares NR when the calculated sum of squares becomes the maximum is made a new peak pixel Pk2. Thus, the fine adjustment of the peak pixel Pk is completed. The fine adjustment is performed for the peak pixel Pk3 in the same way.

With reference to FIGS. 35 and 36 again, it is decided whether or not the sum of squares for each of the peak pixels Pk2 and Pk3 after the fine adjustment is equal to or more than threshold level TH_SUM2 (#224 FIG. 35). Namely, it is decided whether or not the above-mentioned condition (B) is satisfied. As a result of this decision result, it is supposed that the peak pixel Pk2 satisfied the above-mentioned condition (B) (Yes in #224), but the peak pixel Pk3 did not satisfy the above-mentioned condition (B) (No in #224).

In this case, the peak pixel Pk2 is regarded as the head center, so that an area TR1 including the peak pixel Pk2 and the surrounding pixels is extracted from the rectangular area KR1 as shown in FIG. 36B (#225). Then, the extracted rectangular area KR1 is stored as the head detection result plane TK in the result plane memory portion 1M4 or is delivered to the display device 1f (see FIG. 3). This head detection result plane TK is the final detection result of the head center position. In the rectangular area KR1, pixel values of the part from which the area TR1 is extracted are all erased (cleared) so as not to affect other detection (#226).

On the other hand, the peak pixel Pk3 and the surrounding pixels are considered not to be a head, and an area TR2 including the peak pixel Pk2 and the surrounding pixels are erased (cleared) as shown in FIG. 36D so as not to affect other detection (#227).

Furthermore, sizes of the areas TR1 and TR2 and a size of a head to be detected shown in FIG. 36 are defined by the template as shown in FIG. 38.

Then, with reference to FIG. 33 again, the detection process shown in steps #203 and #206 is repeated, and it is checked whether or not there is another rectangular area KR as shown in FIG. 34. If there is another rectangular area KR, the above-mentioned process shown in FIGS. 35 and 36 is performed on the rectangular area KR (#208).

With reference to FIG. 4D again, the count process portion 503 counts the number of head detection result planes TK generated by the detection result plane generation portion 502, i.e., the number of pedestrians HMN detected from the image FG.

The head image display portion 171 shown in FIG. 4A extracts and enlarges the area of the head of the pedestrian HMN from the image FG in accordance with the position of head center indicated in the head detection result plane TK, so as to display it as an enlarged image on the display device 1f (see FIG. 3). Thus, an observer can identify the pedestrian HMN easily. Furthermore, the head image storage portion 172 stores (records) the enlarged image of the head of the pedestrian HMN in the magnetic storage device 1d or an external recording medium (such as a DVD-ROM, an MO or a CD-R). Also, the enlarged image of the head is printed in paper or is transmitted to another computer or other equipment for output.

[Variation of Calculation of the Head Center Degree]

Figure 39:
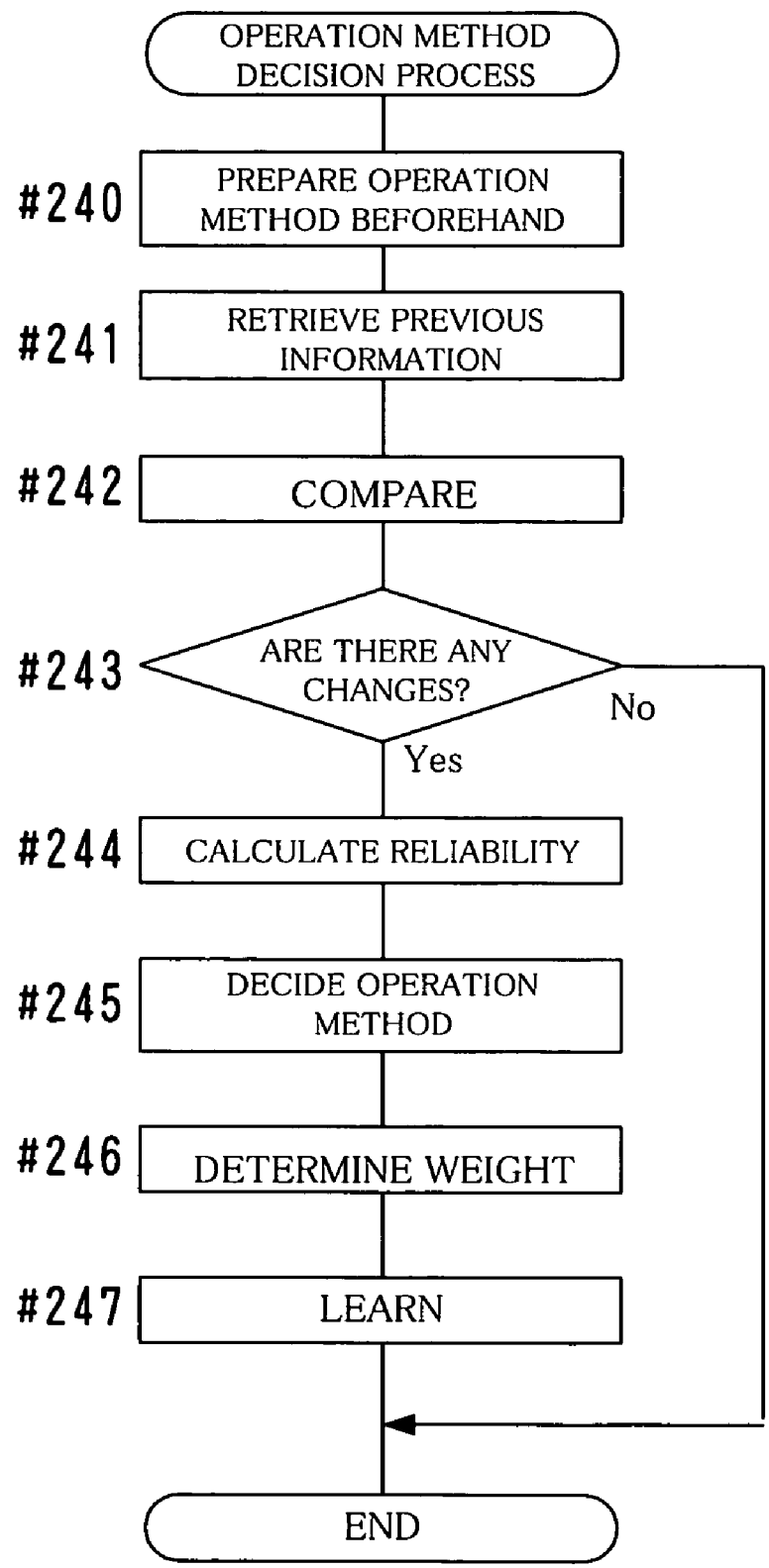
FIG. 39 is a flowchart explaining a variation of a flow of an operation method decision process.

FIG. 39 is a flowchart explaining a variation of a flow of an operation method decision process, and FIG. 40 is a chart showing an example of an operation method selection table TL1.

In the above-explained embodiment, the head center degree of each pixel on the head center degree plane 84 is calculated by multiplying a reliability value of each feature factor plane 8 by its weight w, and by summing them up (see the equation (15)). Alternatively, it is possible, for example, to prepare a plurality of operation methods, and to select one of the operation methods in the procedure as shown in FIG. 39.

First, a plurality of functions that is defined by the following equation (16) is prepared in the database 804 shown in FIG. 28 in advance (#240).

$$TC(i, j) = \chi_m(I1, I2, I3, I4, w1, w2, w3, w4) \quad (16)$$

Here, $0 \leq m \leq$ the number of prepared functions.

In the same procedure explained before with reference to FIG. 30, new reliability values R1-R4 of each feature factor plane 8 are calculated if a variation of the shooting environment is detected (#241-#244).

In accordance with the latest reliability values R1-R4, one of the operation methods is selected (#245). For example, a function for selecting the operation methods, m=f(R1, R2, R3, R4), is prepared, and the selection may be performed in accordance with this function. Alternatively, as shown in FIG. 40, the operation method selection table TL1 is prepared in the database 804 in advance, and the selection may be performed in accordance with this table.

For example, if the selected operation is the geometrical mean, the weights w1-w4 are calculated in accordance with the equation (14) (#246). Next, in accordance with the equation (17), a head center degree TC(i, j) of each pixel is calculated. Namely, the weights w1-w4 are made arithmetical mean of the reliability values R1-R4.

$$TC(i, j) = \prod_{k=1}^{4} I_k^{wk}(i, j) \quad (17)$$

Depending on the operation method, a plurality of methods for calculating the weight w is prepared, and one of the methods may be selected in accordance with the reliability values R1-R4 so as to calculate the weight w.

The selected or calculated function, reliability values R1-R4, and weights w1-w4 are memorized in the reliability memory portion 805. Thus, the human body detection apparatus 1 learns the operation method of each feature factor plane 8 corresponding to the present shooting condition of the video camera 2 (#247).

Then, the detection process portion 105 shown in FIG. 4A uses the operation method that is selected (determined) as explained above, so as to generate the head center degree plane 84 (see FIG. 32).

Figure 41:
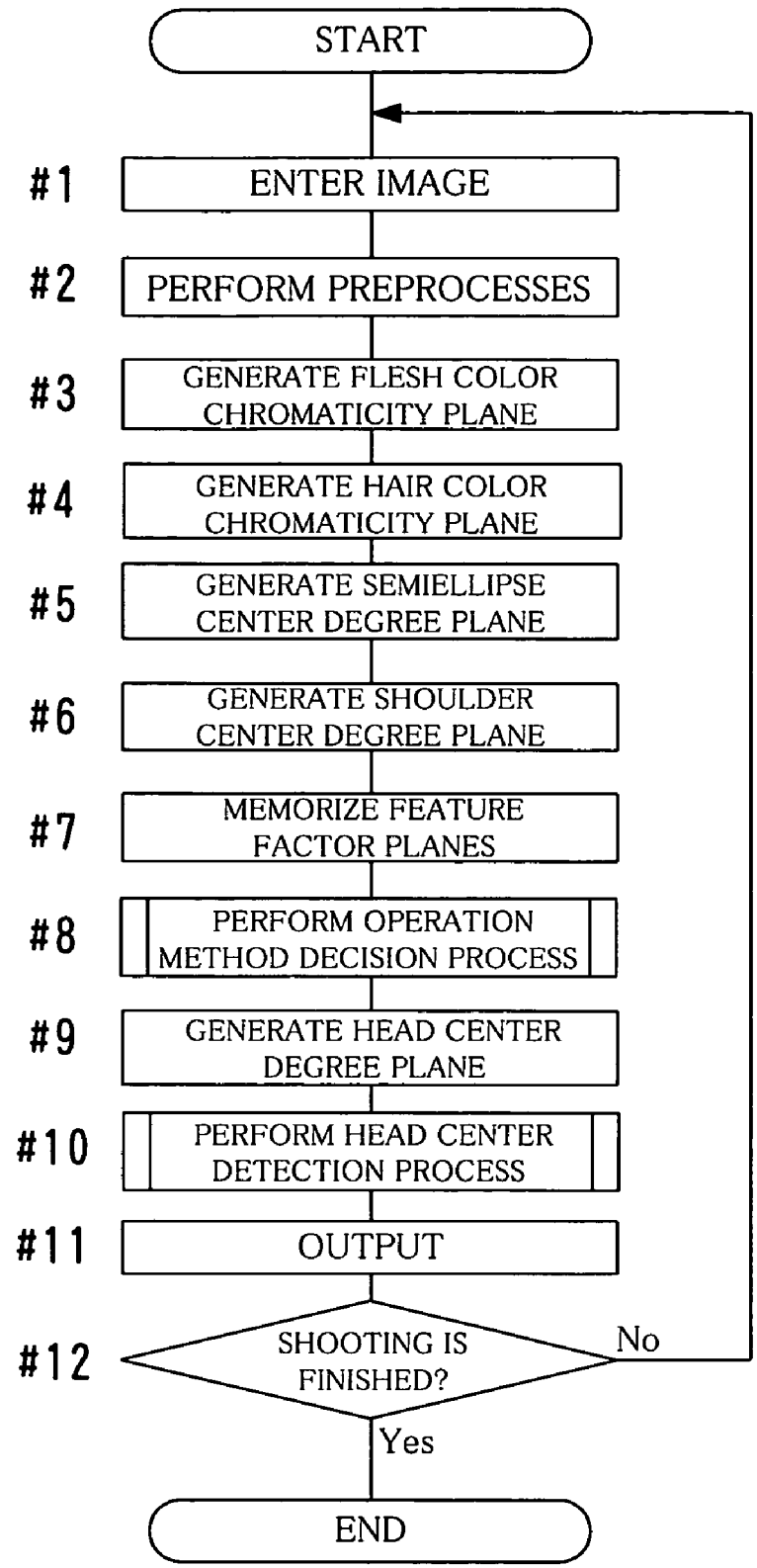
FIG. 41 is a flowchart explaining an example of a flow of a general process by the human body detection apparatus.

FIG. 41 is a flowchart explaining an example of a flow of a general process by the human body detection apparatus 1.

Next, a flow of a process by the human body detection apparatus 1 when detecting a pedestrian from an image taken by the video camera 2 will be explained with reference to the flowchart.

The human body detection apparatus 1 enters an image FG (a frame image) taken by the video camera 2 at a certain time (#1 in FIG. 41), and then the preprocesses including the transformation process of the color space (see FIG. 6), the generation process of the cut-out thumbnail image GS (see FIG. 9), and the generation process of the logical product plane AN (see FIG. 15) are performed (#2).

As shown in FIG. 17, the flesh color chromaticity plane 8FC, the hair color chromaticity plane 8HC, the semiellipse center degree plane 8SE, and the shoulder center degree plane 8SH are generated (#3-#6). The method for generating these feature factor planes 8 is as explained before with reference to FIGS. 19, 20 and 21. These generated feature factor planes 8 are stored in the feature factor plane memory portion 1M1 (#7).

A process for determining an operation method for calculating a head center degree is performed (#8), and the determined operation method is used for generating the head center degree plane 84 (see FIG. 32) (#9). The process for determining is performed by one of the procedures as explained before with reference to FIGS. 30 and 39.

A head position of the pedestrian to be detected and the center are detected in accordance with the generated head center degree plane 84 (#10), and the head detection result plane TK that indicates the final detection result as shown in FIG. 36B is generated. Then, in accordance with this result, the head area of the pedestrian HMN is extracted from the image FG that was entered in the step #1 and enlarged, which is delivered to the display device 1f (see FIG. 3) or an external device as the enlarged image (#11).

The process in the step #1-#11 is performed repeatedly while the video camera 2 continues to take images (No in #12). Furthermore, the operation method decision process in the step #8 is not required to perform every time, but is sufficient to perform at a predetermined timing. For example, it may be performed once for a time set by an operator. Alternatively, it may be performed when a special sort of condition information 72 is obtained or entered. If the operation method decision process is not performed, the operation method that was learned before is used for generating the head center degree plane 84.

According to this embodiment, a plurality of feature factors is calculated in accordance with the shooting condition detected from the present or the past image (frame) taken by the video camera 2 or the shooting condition detected by the sensor 3, and the operation method is learned so that the usage of the feature factors is adapted to the shooting condition. Then, the learned operation method is used for detecting a head center of a pedestrian. Therefore, even if there is a change in the shooting environment or others when detecting a target object, the target object can be detected correctly with suppressing a drop of a process speed.

For example, if the number of pedestrians becomes larger than usual, an occlusion is generated so that contour of shoulders of a pedestrian hardly appears in the shot image (frame). As a result, reliability of the shoulder center degree (see FIG. 17) is deteriorated. However, the pedestrian can be detected properly by giving large weights to other three feature factors so as to compensate the drop of the reliability. On this occasion, since additional detection of a feature factor is not performed except the these four sorts of feature factors, the pedestrian can be detected without dropping a process speed. Similarly, if flesh color or hair color cannot be detected properly due to a situation of lighting or a background (a floor or a wall), reliability of the flesh color chromaticity or the hair color chromaticity is deteriorated. However, the pedestrian can be detected correctly with suppressing the drop of process speed, by giving large weights to other feature factors.

Figure 42:
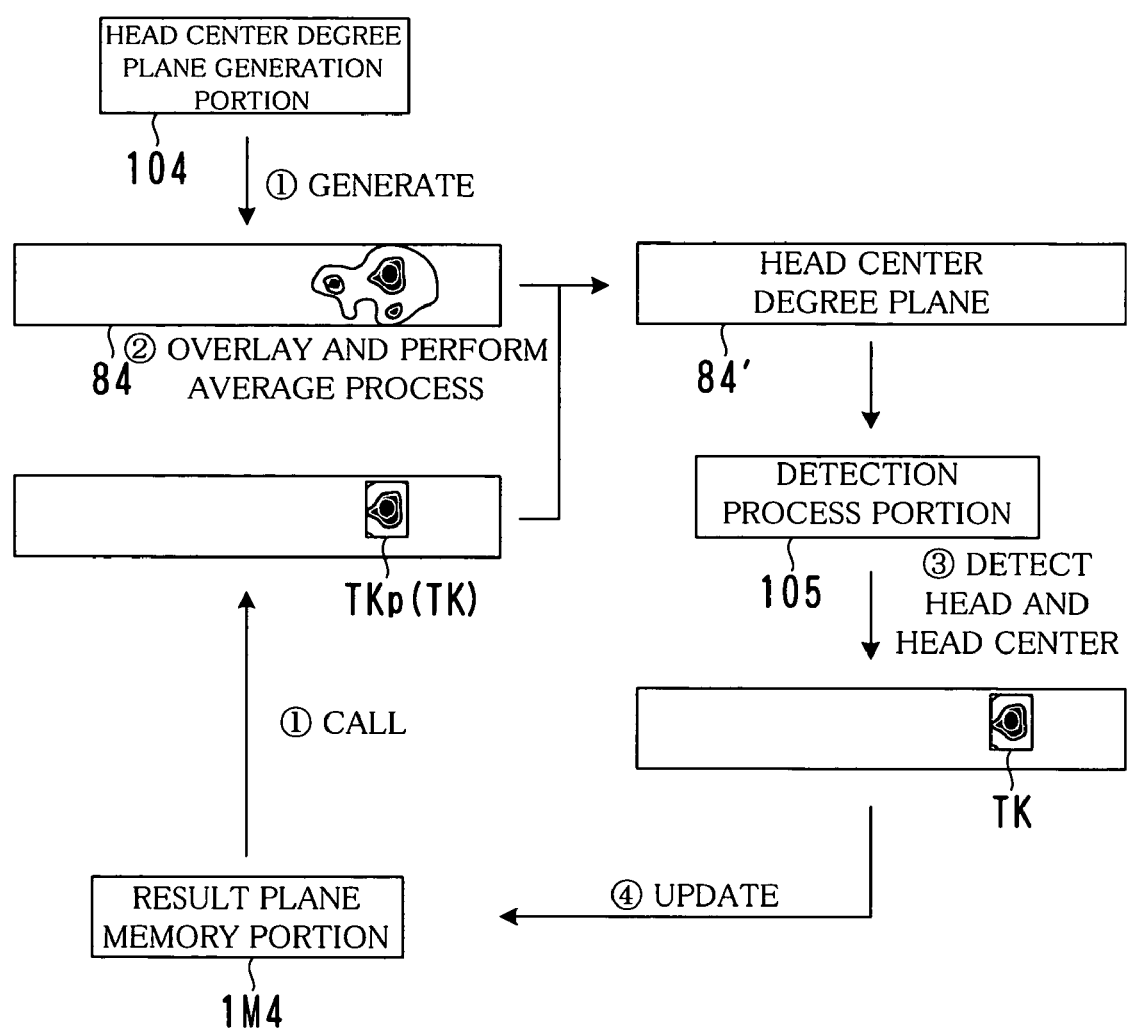
FIG. 42 is a diagram showing an example of a method of detecting a head center utilizing the head detection result plane in the previous frame.

FIG. 42 is a diagram showing an example of a method of detecting a head center utilizing the head detection result plane TK in the previous frame.

In this embodiment, the process on each image or on each pixel constituting each plane is performed in the order such that the horizontal direction is a main scanning direction. However, it is possible to perform the process in the order such that the vertical direction is the main scanning direction. Alternatively, it is possible to perform the process in the order from the pixel at the lower right corner. In this way, the process order can be changed if necessary.

In this embodiment, as a feature factor, four sorts of feature factors including flesh color chromaticity, hair color chromaticity, semiellipse center degree, and shoulder center degree are calculated, so that a human head center is detected in accordance with these feature factors. However, it is possible to detect by combining feature factors other than these feature factors. For example, a human head center may be detected in accordance with an optical flow, matching degree with a template having a shape of a part such as an eye or a mouth, a detection result of a detection method utilizing a background differential, a detection result of a detection method using a texture.

Coefficients, constants, threshold levels, or functions that are used in the equations (1)-(17) can be changed if necessary in accordance with a purpose of using the monitoring system 100, an environment of the place where the video camera 2 is installed, a specification of the video camera 2, or other various conditions. Furthermore, a combination and a generation order of the feature factor plane 8 can be changed in accordance with these conditions if necessary.

In this embodiment, when detecting a head center of a pedestrian HMN from the image FG shown in FIG. 5, this image FG is reduced so that the reduced image (the cut-out thumbnail image GS shown in FIG. 8) is used. However, it is possible to use this image FG without reducing it. Although the flesh color chromaticity and the hair color chromaticity are calculated in accordance with the YUV space value, it may be calculated in accordance with a value of other color space such as a RGB space.

In this embodiment, as shown in the equation (12), the reliability values R1-R4 are calculated by calculating an individual reliability value for each shooting condition (environment parameter θ) and by summing up these individual reliability values. However, there is a case where a plurality of shooting conditions has relationship with each other and affects the reliability. Accordingly, it is possible to define a function by the following equation (18) so that the reliability values R1-R4 can be calculated in accordance with this function.

$$Ri = fi(\theta 1, \theta 2, \ldots, \theta N) \tag{18}$$

Here, i=1, 2, 3 or 4

When generating the head detection result plane TK, it is possible to use the head detection result plane TKp that is a detection result in the just previous frame so that detection accuracy is improved. It is because that the head center position indicated by the head detection result plane TKp must be substantially identical to the head center position to be detected this time though there is some shift due to a movement of the pedestrian. For example, the head detection result plane TKp may be used in the procedure as shown in FIG. 42.

A head center degree plane 84' is generated by calculating a mean value of pixel values of corresponding pixels between the head center degree plane 84 of the present frame and the head detection result plane TKp of the previous frame. Then, the detection process portion 105 performs the process as explained before with reference to FIGS. 33 and 35 in accordance with the head center degree plane 84', so as to generate the head detection result plane TK. Furthermore, the generated head detection result plane TK is stored in the result plane memory portion 1M4 for generation of the head detection result plane TK in the next frame.

As the condition information 72, it is possible to use the head detection result in the previous frame or the evaluation about the head detection by the operator (such as the evaluation whether or not the result of indicating the head by the operator who viewed the image and the decision result by the apparatus).

The human body detection apparatus 1 of the present invention may be used for detecting an object except a human body. For example, it may be used for detecting an animal body, a rectangular solid, or a license plate of a car or a motorcycle.

Moreover, a structure of the entire or a part of the monitoring system 100, the human body detection apparatus 1 and the video camera 2, the method of generating the feature factor plane 8, the method of calculating the center degree, the contents of process or the order of process can be changed if necessary in the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An object detection apparatus for detecting a target object in an image, comprising:
    an image input portion for entering a shot image that is taken by a camera;
    a plurality of feature detection portions for detecting features of the shot image by using different methods;
    a shooting condition obtaining portion for obtaining information indicating conditions for shooting by the camera;
    a reliability calculation portion for calculating reliability of the feature that is detected by each of the feature detection portions in the conditions indicated by the information obtained by the shooting condition obtaining portion; and
    an object detection portion for detecting the object in the shot image in accordance with the features detected respectively by one or more of the plural feature detection portions from the shot image and the reliability of the features calculated by the reliability calculation portion.

2. The object detection apparatus according to claim 1, wherein the feature detection portion detects the feature as a feature quantity, and the object detection portion detects the object in accordance with the feature quantity of each feature that has a weight corresponding to the reliability of each feature.

3. The object detection apparatus according to claim 2, wherein the feature detection portion delivers a feature image that indicates a feature degree indicating the degree of the feature in each pixel of the shot image as a result of detecting the feature quantity of the shot image, and
the object detection portion detects the object in accordance with the feature image.

4. The object detection apparatus according to claim 3, further comprising
a composite image generation portion for generating a composite image by adding values of corresponding pixels of plural feature images, wherein
the feature detection portion delivers the feature image for each of the plural sorts of features,
the composite image generation portion generates the composite image in accordance with each of the plural sorts of feature images, and
the object detection portion detects the object in accordance with the composite image generated by the composite image generation portion.

5. The object detection apparatus according to claim 4, wherein the object detection portion detects a position of the object in accordance with a pixel having a pixel value larger than a predetermined value and pixel values of pixels surrounding said pixel among the pixels of the composite image.

6. The object detection apparatus according to claim 1, further comprising a reliability memory portion for memorizing the reliability of the feature calculated by the reliability calculation portion, wherein
the reliability calculation portion calculates the reliability of the feature at a predetermined timing, and
the object detection portion detects the object in the shot image in accordance with the latest feature memorized in the reliability memory portion.

7. The object detection apparatus according to claim 1, further comprising a shooting condition memory portion for memorizing information that indicates the conditions obtained by the shooting condition obtaining portion, wherein
the reliability calculation portion performs a process for calculating the reliability if a difference between the information indicating the conditions obtained by the shooting condition obtaining portion and the information that is memorized in the shooting condition memory portion and indicates the conditions in the past is larger than a predetermined quantity or a predetermined ratio.

8. The object detection apparatus according to claim 1, wherein
the object is a human body, and
the feature detection portion is a section for calculating a matching degree between the shot image and a template having a semiellipse shape for obtaining the feature, a section for detecting a likelihood of a flesh color in each of sectioned areas of a pixel plane of the shot image for obtaining the feature, a section for detecting a likelihood of a hair color in the area of the shot image for obtaining the feature, or a section for calculating a matching degree between the shot image and a template having shapes of shoulders for obtaining the feature.

9. The object detection apparatus according to claim 1, wherein the shooting condition obtaining portion obtains information about setting of the camera, information about a state of a shooting area of the camera, or information about an object of which the camera takes an image as the information that indicates the conditions.

10. An object detection apparatus for detecting a target object in an image, comprising:
- an image input portion for entering a shot image that is taken by a camera;
- a plurality of feature detection portions for detecting features of the shot image by using different methods;
- a shooting condition obtaining portion for obtaining information indicating conditions for shooting by the camera;
- a reliability calculation portion for calculating reliability of the feature that is detected by each of the feature detection portions in the conditions;
- an operation method decision portion for deciding an operation method for detecting the object in accordance with the reliability calculated by the reliability calculation portion for each feature detected by each of the feature detection portions; and
- an object detection portion for detecting the object in the shot image in accordance with the features detected respectively by one or more of the plural feature detection portions and the operation method decided by the operation method decision portion.

11. The object detection apparatus according to claim 10, wherein
- the feature detection portion delivers a feature image that indicates a feature degree indicating the degree of the feature in each pixel of the shot image as a result of detecting the feature quantity of the shot image, and
- the object detection portion detects the object in accordance with the feature image.

12. The object detection apparatus according to claim 11, further comprising
- a composite image generation portion for generating a composite image of plural feature images by performing an operation in accordance with the operation method decided by the operation method decision portion, wherein
- the feature detection portion delivers the feature image for each of the plural sorts of features,
- the composite image generation portion generates the composite image in accordance with each of the plural sorts of feature images, and
- the object detection portion detects the object in accordance with the composite image generated by the composite image generation portion.

13. The object detection apparatus according to claim 12, wherein the object detection portion detects a position of the object in accordance with a pixel having a pixel value larger than a predetermined value and pixel values of pixels surrounding said pixel among the pixels of the composite image.

14. The object detection apparatus according to claim 10, further comprising a shooting condition memory portion for memorizing information that indicates the conditions obtained by the shooting condition obtaining portion, wherein
- the reliability calculation portion performs a process for calculating the reliability if a difference between the information indicating the conditions obtained by the shooting condition obtaining portion and the information that is memorized in the shooting condition memory portion and indicates the conditions in the past is larger than a predetermined quantity or a predetermined ratio.

15. The object detection apparatus according to claim 10, wherein the shooting condition obtaining portion obtains information about setting of the camera, information about a state of a shooting area of the camera, or information about an object of which the camera takes an image as the information that indicates the conditions.

16. An object detection method for detecting a target object in an image, comprising:
- a step of entering a shot image that is taken by a camera;
- a step of detecting features of the shot image by using different feature detection methods;
- a step of obtaining information indicating conditions for shooting by the camera;
- a step of calculating reliability of the feature that is detected by each of the feature detection methods in the conditions indicated by the obtained information; and
- a step of detecting the object in the shot image in accordance with the features detected respectively by one or more of the plural feature detection methods from the shot image and reliability of the features.

17. The object detection method according to claim 16, wherein
- the step of detecting the feature includes detecting the feature as a feature quantity, and
- the step of detecting the object includes detecting the object in accordance with the feature quantity of each feature that has a weight corresponding to the reliability of each feature.

18. The object detection method according to claim 16, further comprising a step of deciding an operation method for detecting the object in accordance with the reliability of each of the features, wherein
- the step of detecting the object includes detecting the object in the shot image in accordance with the operation method decided on the basis of the reliability of the feature.

19. A computer-readable medium having stored a computer program product for performing the steps of:
- entering a shot image that is taken by a camera;
- detecting features of the shot image by using different feature detection methods;
- obtaining information indicating conditions for shooting by the camera;
- calculating reliability of the feature that is detected by each of the feature detection methods in the conditions indicated by the obtained information; and
- detecting the object in the shot image in accordance with the features detected respectively by one or more of the plural feature detection methods from the shot image and the reliability of the features.

20. A monitoring system comprising:
- a video camera for taking an image; and
- an object detection apparatus for detecting a target object in the image taken by the video camera, including
  - an image input portion for entering a shot image that is taken by the video camera,
  - a plurality of feature detection portions for detecting features of the shot image by using different methods,
  - a shooting condition obtaining portion for obtaining information indicating conditions for shooting by the video camera,
  - a reliability calculation portion for calculating reliability of the feature that is detected by each of the feature detection portions in the conditions indicated by the information obtained by the shooting condition obtaining portion, and
  - an object detection portion for detecting the object in the shot image in accordance with the features detected respectively by one or more of the plural feature detection portions from the shot image and the reliability of the features calculated by the reliability calculation portion.

21. The monitoring system according to claim 20, further comprising an operation method decision portion for deciding an operation method for detecting the object in accordance with the reliability calculated by the reliability calculation portion, of each feature detected by each of the feature detection portions, wherein the object detection portion detects the object in the shot image in accordance the operation method determined on the basis of the reliability of the feature.

22. The monitoring system according to claim 20, further comprising an image display device for display an image area of the object detected by the object detection apparatus after enlarging the image area within the image taken by the video camera.

23. The monitoring system according to claim 20, further comprising a recording device for recording the image if the object is detected in the image taken by the video camera.

* * * * *